(12) United States Patent
Nemoto

(10) Patent No.: US 9,069,112 B2
(45) Date of Patent: Jun. 30, 2015

(54) LENS ARRAY UNIT, ERECTING EQUAL-MAGNIFICATION LENS ARRAY, OPTICAL SCANNING UNIT, IMAGE READING DEVICE, AND IMAGE WRITING DEVICE

(71) Applicant: Nippon Sheet Glass Company, Limited, Tokyo (JP)

(72) Inventor: Hiroyuki Nemoto, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 14/191,753

(22) Filed: Feb. 27, 2014

(65) Prior Publication Data

US 2014/0176657 A1 Jun. 26, 2014

Related U.S. Application Data

(62) Division of application No. 13/778,554, filed on Feb. 27, 2013, now Pat. No. 8,698,865.

(30) Foreign Application Priority Data

Feb. 29, 2012 (JP) ................. 2012-043672

(51) Int. Cl.
| | | |
|---|---|---|
| *B41J 15/14* | (2006.01) | |
| *B41J 27/00* | (2006.01) | |
| *G02B 27/10* | (2006.01) | |
| *G02B 3/00* | (2006.01) | |
| *G03G 15/043* | (2006.01) | |
| *G03G 15/04* | (2006.01) | |
| *G03G 15/041* | (2006.01) | |

(52) U.S. Cl.
CPC ............ *G02B 3/0068* (2013.01); *G02B 3/0075* (2013.01); *G03G 15/0435* (2013.01); *G03G 15/04036* (2013.01); *G03G 15/04054* (2013.01); *G02B 3/005* (2013.01); *G02B 3/0062* (2013.01); *G02B 3/0037* (2013.01); *G03G 15/0409* (2013.01); *G03G 15/041* (2013.01)

(58) Field of Classification Search
CPC .... G02B 3/0037; G02B 3/005; G02B 3/0062; G02B 3/0068; G02B 3/0075; G02B 6/0076; B41J 2/45; B41J 2/451
USPC .................. 347/241, 242, 244, 245, 256–258; 359/621–623
See application file for complete search history.

(56) References Cited

U.S. PATENT DOCUMENTS

| | | | |
|---|---|---|---|
| 6,707,613 B2 | 3/2004 | Fujimoto et al. | |
| 6,717,734 B2 * | 4/2004 | Fujimoto | ...................... 359/619 |
| 7,898,738 B2 | 3/2011 | Yamamura | |
| 2010/0073772 A1 | 3/2010 | Ito | |
| 2012/0224242 A1 * | 9/2012 | Shimmo et al. | ............ 359/201.1 |

FOREIGN PATENT DOCUMENTS

JP 2011-17840 A 1/2011

* cited by examiner

*Primary Examiner* — Hai C Pham
(74) *Attorney, Agent, or Firm* — Sughrue Mion, PLLC

(57) ABSTRACT

A first lens array unit includes a first lens array plate and a second lens array plate in which a plurality of lenses are provided in the main scanning direction, and a first light shielding member piece and a second light shielding member piece provided with a plurality of through holes corresponding to the lenses. The first lens array plate, the second lens array plate, the first light shielding member piece, and the second light shielding member piece are formed as one piece. The lens array is built by bending joints joining the lens array plates and the light shielding member pieces such that the lens is located to directly face the corresponding through hole.

20 Claims, 24 Drawing Sheets

SUB-SCANNING DIRECTION

SUB-SCANNING DIRECTION

SUB-SCANNING DIRECTION

MAIN SCANNING DIRECTION

MAIN SCANNING DIRECTION

MAIN SCANNING DIRECTION

MAIN SCANNING DIRECTION

MAIN SCANNING DIRECTION

MAIN SCANNING DIRECTION

LENS ARRAY UNIT, ERECTING EQUAL-MAGNIFICATION LENS ARRAY, OPTICAL SCANNING UNIT, IMAGE READING DEVICE, AND IMAGE WRITING DEVICE

This is a Divisional of application Ser. No. 13/778,554 filed Feb. 27, 2013, claiming priority based on Japanese Patent Application No. 2012-043672, filed on Feb. 29, 2012, the disclosures of which are incorporated herein in their entirety by reference.

BACKGROUND OF THE INVENTION

1. Field of the Invention

The present invention relates to lens array units used in image reading devices and image forming devices.

2. Description of the Related Art

Some image reading devices such as scanners are known to use erecting equal-magnification optics. Erecting equal-magnification optics are capable of reducing the size of devices better than reduction optics. In the case of image reading devices, an erecting equal-magnification optical system comprises a linear light source, an erecting equal-magnification lens array, and a linear image sensor.

In the related art, a rod lens array capable of forming an erect equal-magnification image is used as an erecting equal-magnification lens array in an erecting equal-magnification optical system. Recently, however, there is proposed an erecting equal-magnification lens array plate comprising a stack of two transparent lens array plates built such that the optical axes of individual convex lenses are aligned, where each transparent lens array plate includes a systematic arrangement of micro-convex lenses on both surfaces of the plate.

The erecting equal-magnification lens array such as this lacks a wall for beam separation between adjacent lenses. Therefore, there is a problem in that a light beam diagonally incident on the erecting equal-magnification lens array travels diagonally inside the plate and enters an adjacent convex lens, creating noise (referred to as ghost noise) as it leaves the plate. Light that does not contribute to imaging and that forms ghost is called stray light.

In one relate-art measure to address stray light, a light shielding member is provided to sandwich two lens array plates and a light shielding member is provided between the two lens array plates (see, for example, patent document No. 1).

[Patent document No. 1] JP2011-17840

A disadvantage with an erecting equal-magnification lens array comprising a stack of two lens array plates and three light shielding members is that the number of components is large and the array will be expensive.

SUMMARY OF THE INVENTION

The present invention addresses the aforementioned disadvantage and a purpose thereof is to provide an inexpensive lens array unit, erecting equal-magnification lens array, optical scanning unit, image reading device, and image writing device.

In order to address the challenge, the lens array unit according to at least one embodiment comprises a lens array plate in which a plurality of lenses are provided in the main scanning direction, and a light shielding member provided with a plurality of through holes corresponding to the lenses. The lens array plate and the light shielding member are formed as one piece such that respective ends thereof in the sub-scanning direction are joined. The lens array unit is built by bending joints joining the lens array plate and the light shielding member such that the lens is located to directly face the corresponding through hole.

The lens array unit may further comprise a latch part for maintaining an assembled state of the lens array unit.

The lens array unit may further comprise a gap adjustment part for defining a distance between the lens and the through hole.

A concave-convex fitting structure may be formed in a portion of contact between the first light shielding member piece and the second light shielding member piece.

Another embodiment of the present invention relates to an erecting equal-magnification lens array. The erecting equal-magnification lens array comprises a stack of two lens array units described above.

Another embodiment of the present invention also relates to a lens array unit. The lens array unit comprises: a first lens array plate in which a plurality of first lenses are provided in the main scanning direction; a second lens array plate in which a plurality of second lenses are provided in the main scanning direction; and a light shielding member provided with a plurality of through holes corresponding to the first and second lenses and including a first light shielding member piece and a second light shielding member piece produced by splitting the light shielding member by a plane through both open ends of the plurality of through holes. One end of the first lens array plate in the sub-scanning direction is joined to one end of the second light shielding member piece in the sub-scanning direction, the other end of the first lens array plate in the sub-scanning direction is joined to one end of the first light shielding member piece in the sub-scanning direction, and the other end of the first light shielding member piece in the sub-scanning direction is joined to one end of the second lens array plate in the sub-scanning direction, and the first lens array plate, the second lens array plate, the first light shielding member piece, and the second light shielding member piece are formed as one piece. The lens array is built by bending joints joining the first lens array plate, the second lens array plate, the first light shielding member, and the second light shielding member such that the first lens is located to directly face one opening of the through hole, and the second lens is located to directly face the other opening of the through hole.

Another embodiment of the present invention also relates to an erecting equal-magnification lens array. The erecting equal-magnification lens array comprises a stack of two lens array units described above. The two lens array units may be stacked such that surfaces thereof not formed with lenses face each other.

Another embodiment of the present invention also relates to an erecting equal-magnification lens array. The erecting equal-magnification lens array comprises: a first lens array plate in which a plurality of first lenses are provided in the main scanning direction; a second lens array plate in which a plurality of second lenses are provided on one surface of the plate in the main scanning direction, and a plurality of third lenses are provided on the other surface in the main scanning direction; a third lens array plate in which a plurality of fourth lenses are provided in the main scanning direction; a first light shielding member provided with a plurality of first through holes corresponding to the first and second lenses and including a first light shielding member piece and a second light shielding member piece produced by splitting the first light shielding member by a plane through both open ends of the plurality of first through holes; and a second light shielding member provided with a plurality of second through holes corresponding to the third and fourth lenses and including a third light shielding member piece and a fourth light shielding member piece produced by splitting the second light shielding member by a plane through both open ends of the plurality of second through holes. The first lens array plate and the first light shielding member are formed as one piece, and one end of the first lens array plate in the sub-scanning direction is joined to one end of the first light shielding member piece in the sub-scanning direction, and the other end of the first lens array plate in the sub-scanning direction is joined to one end of the second light shielding member piece in the sub-scanning direction. The lens array is built by bending joints joining the first lens array plate and the first and second light shielding member pieces such that the first lens is located to directly face one opening of the first through hole. The third lens array plate and the second light shielding member are formed as one piece, and one end of the third lens array plate in the sub-scanning direction is joined to one end of the third light shielding member piece in the sub-scanning direction, and the other end of the third lens array plate in the sub-scanning direction is joined to one end of the fourth light shielding member piece in the sub-scanning direction. The lens array is built by bending joints joining the third lens array plate and the third and fourth light shielding member pieces such that the fourth lens is located to directly face one opening of the second through hole. The first, second, and third lens array plates are stacked such that the second lens is located to directly face the other opening of the first through hole and the third lens is located to directly face the other opening of the second through hole.

The erecting equal-magnification lens array may further comprise a latch part for maintaining an assembled state of the lens array unit.

The erecting equal-magnification lens array may further comprise: a first gap adjustment part for defining a distance between the first lens and the first through hole, a second gap adjustment part for defining a distance between the second lens and the first through hole, a third gap adjustment part for defining a distance between the third lens and the second through hole, and a fourth gap adjustment part for defining a distance between the fourth lens and the second through hole.

A concave-convex fitting structure may be formed in a portion of contact between the first light shielding member piece and the second light shielding member piece, and a concave-convex fitting structure may be formed in a portion of contact between the third light shielding member piece and the fourth light shielding member piece.

Another embodiment of the present invention also relates to a lens array unit. The lens array unit comprises: a first lens array plate in which a plurality of first lenses are provided in the main scanning direction; a second lens array plate in which a plurality of second lenses are provided in the main scanning direction; and a light shielding member provided with a plurality of through holes corresponding to the first and second lenses and including a first light shielding member piece and a second light shielding member piece produced by splitting the light shielding member by a plane intersecting central axes of the plurality of through holes. One end of the first lens array plate in the sub-scanning direction is joined to one end of the first light shielding member piece in the sub-scanning direction, the other end of the first light shielding member piece in the sub-scanning direction is joined to one end of the second light shielding member piece in the sub-scanning direction, and the other end of the second light shielding member piece in the sub-scanning direction is joined to one end of the second lens array plate in the sub-scanning direction. The first lens array plate, the second lens array plate, the first light shielding member piece, and the second light shielding member piece are formed as one piece, and the lens array is built by bending joints joining the first lens array plate, the second lens array plate, the first light shielding member piece, and the second light shielding member piece such that the first lens is located to directly face one opening of the through hole, and the second lens is located to directly face the other opening of the through hole.

The lens array unit may further comprise: a latch part for maintaining an assembled state of the lens array unit.

The lens array unit may further comprise a first gap adjustment part for defining a distance between the first lens and the through hole and a second gap adjustment part for defining a distance between the second lens and the through hole.

A concave-convex fitting structure may be formed in a portion of contact between the first light shielding member piece and the second light shielding member piece.

Another embodiment of the present invention also relates to an erecting equal-magnification lens array. The erecting equal-magnification lens array comprises: a first lens array plate in which a plurality of first lenses are provided in the main scanning direction; a second lens array plate in which a plurality of second lenses are provided on one surface of the plate in the main scanning direction, and a plurality of third lenses are provided on the other surface in the main scanning direction; a third lens array plate in which a plurality of fourth lenses are provided in the main scanning direction; a first light shielding member provided with a plurality of first through holes corresponding to the first and second lenses and including a first light shielding member piece and a second light shielding member piece produced by splitting the first light shielding member by a plane intersecting central axes of the plurality of first through holes; and a second light shielding member provided with a plurality of second through holes corresponding to the third and fourth lenses and including a third light shielding member piece and a fourth light shielding member piece produced by splitting the second light shielding member by a plane intersecting central axes of the plurality of second through holes. The first lens array plate, the second lens array plate, the third lens array plate, the first light shielding member piece, the second light shielding member piece, the third light shielding member piece, and the fourth light shielding member piece are formed as one piece, and one end of the first lens array plate in the sub-scanning direction is joined to one end of the first light shielding member piece in the sub-scanning direction, the other end of the first light shielding member piece in the sub-scanning direction is joined to one end of the second light shielding member piece in the sub-scanning direction, the other end of the second light shielding member piece in the sub-scanning direction is joined to one end of the second lens array plate in the sub-scanning direction, the other end of the second lens array plate in the sub-scanning direction is joined to one end of the third light shielding member piece in the sub-scanning direction, the other end of the third light shielding member piece in the sub-scanning direction is joined to one end of the fourth light shielding member piece in the sub-scanning direction, and the other end of the fourth light shielding member piece in the sub-scanning direction is joined to one end of the third lens array plate in the sub-scanning direction. The lens array is built by bending joints joining the first lens array plate, the first light shielding member piece, the second light shielding member piece, the second lens array plate, the third light shielding member piece, the fourth light shielding member piece, and the third lens array plate such that the first lens is located to directly face one opening of the first through hole, the second lens is located to directly face the other opening of the first through hole, the third lens is located to directly face one opening of the second through hole, and the fourth lens is located to directly face the other opening of the second through hole.

The erecting equal-magnification lens array may further comprise: a latch part for maintaining an assembled state of the erecting equal-magnification lens array unit.

The erecting equal-magnification lens array may further comprise: a first gap adjustment part for defining a distance between the first lens and the first through hole, a second gap adjustment part for defining a distance between the second lens and the first through hole, a third gap adjustment part for defining a distance between the third lens and the second through hole, and a fourth gap adjustment part for defining a distance between the fourth lens and the second through hole.

A concave-convex fitting structure may be formed in a portion of contact between the first light shielding member piece and the second light shielding member piece, and/or a concave-convex fitting structure may be formed in a portion of contact between the third light shielding member piece and the fourth light shielding member piece.

Another embodiment of the present invention relates to an optical scanning unit comprising the lens array unit or the erecting equal-magnification lens array described above.

Another embodiment of the present invention relates to an image reading device comprising: the aforementioned optical scanning unit; and an image processing unit configured to process an image signal detected by the optical scanning unit.

Another embodiment of the present invention relates to an image writing device comprising: an LED array comprising an array of a plurality of LED's; the lens array unit or the erecting equal-magnification lens array described above for condensing light emitted from the LED array; and a photosensitive drum for receiving the light transmitted through the lens array unit or the erecting equal-magnification lens array.

DETAILED DESCRIPTION OF THE INVENTION

The invention will now be described by reference to the preferred embodiments. This does not intend to limit the scope of the present invention, but to exemplify the invention.

A description will be given of the lens array unit according to an embodiment of the present invention.

Figure 1:
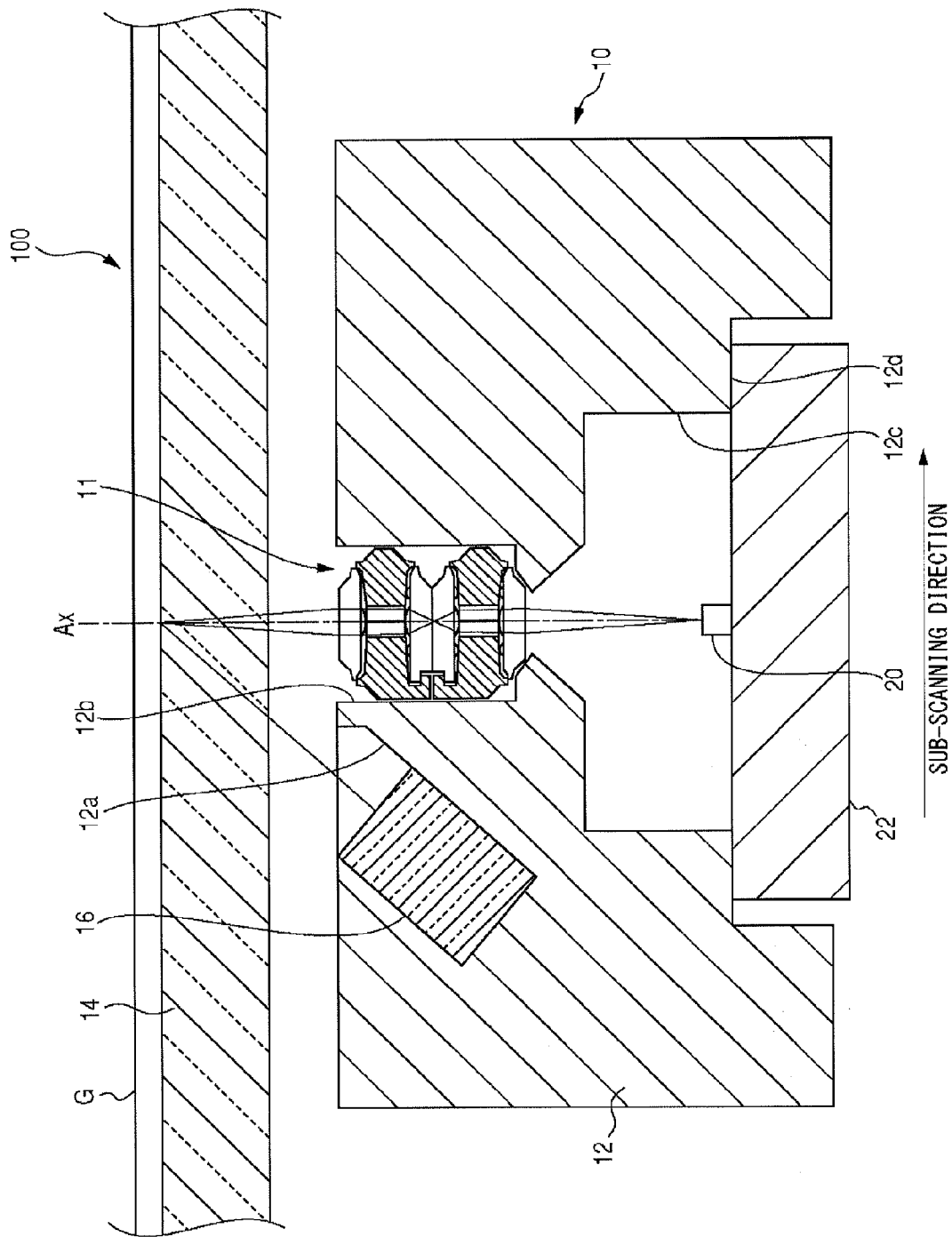
FIG. 1 shows an image reading device in which the lens array unit according to the first embodiment of the present invention is used.

FIG. 1 shows an image reading device 100 in which the lens array unit according to the first embodiment of the present invention is used. As shown in FIG. 1, the image reading device 100 comprises an optical scanning unit 10, a glass plate 14 on which a document G is placed, a driving mechanism (not shown) for driving the optical scanning unit 10, and an image processing unit (not shown) for processing data read by the optical scanning unit 10.

The optical scanning unit 10 comprises a linear light source 16 for illuminating a document G placed on the glass plate 14, an erecting equal-magnification lens array 11 for condensing light reflected from the document G, a linear image sensor (photoelectric transducer) 20 for receiving light condensed by the erecting equal-magnification lens array 11, and a housing 12 for housing the linear light source 16, the erecting equal-magnification lens array 11, and the linear image sensor 20.

The housing 12 is substantially cuboid in shape. A first recess 12a and a second recess 12b are formed in the upper part of the housing 12 and a third recess 12c is formed in the lower part. The housing 12 is formed by injection-molding a resin. By forming the housing 12 by injection molding, the housing 12 can be formed easily at a low cost. The linear light source 16 is diagonally fixed inside the first recess 12a. The linear light source 16 is secured such that the optical axis of the illuminating light passes through the intersection of the optical axis Ax of the erecting equal-magnification lens array 11 and the top surface of the glass plate 14.

The erecting equal-magnification lens array 11 is fitted in the second recess 12b. A substrate 22 provided with the linear image sensor 20 is fitted in the third recess 12c. The substrate 22 is secured such that the top surface thereof is in contact with a step 12d provided in the third recess 12c.

The erecting equal-magnification lens array 11 is installed in the image reading device 100 such that the longitudinal direction thereof is aligned with the main scanning direction and the lateral direction thereof is aligned with the sub-scanning direction. The erecting equal-magnification lens array 11 is configured to receive linear light reflected from the document G located above and form an erect equal-magnification image on an image plane located below, i.e., a light-receiving surface of the linear image sensor 20. The image reading device 100 can read the document G by scanning document G with the optical scanning unit 10 in the sub-scanning direction.

A detailed description of the erecting equal-magnification lens array 11 will be given.

Figure 2:
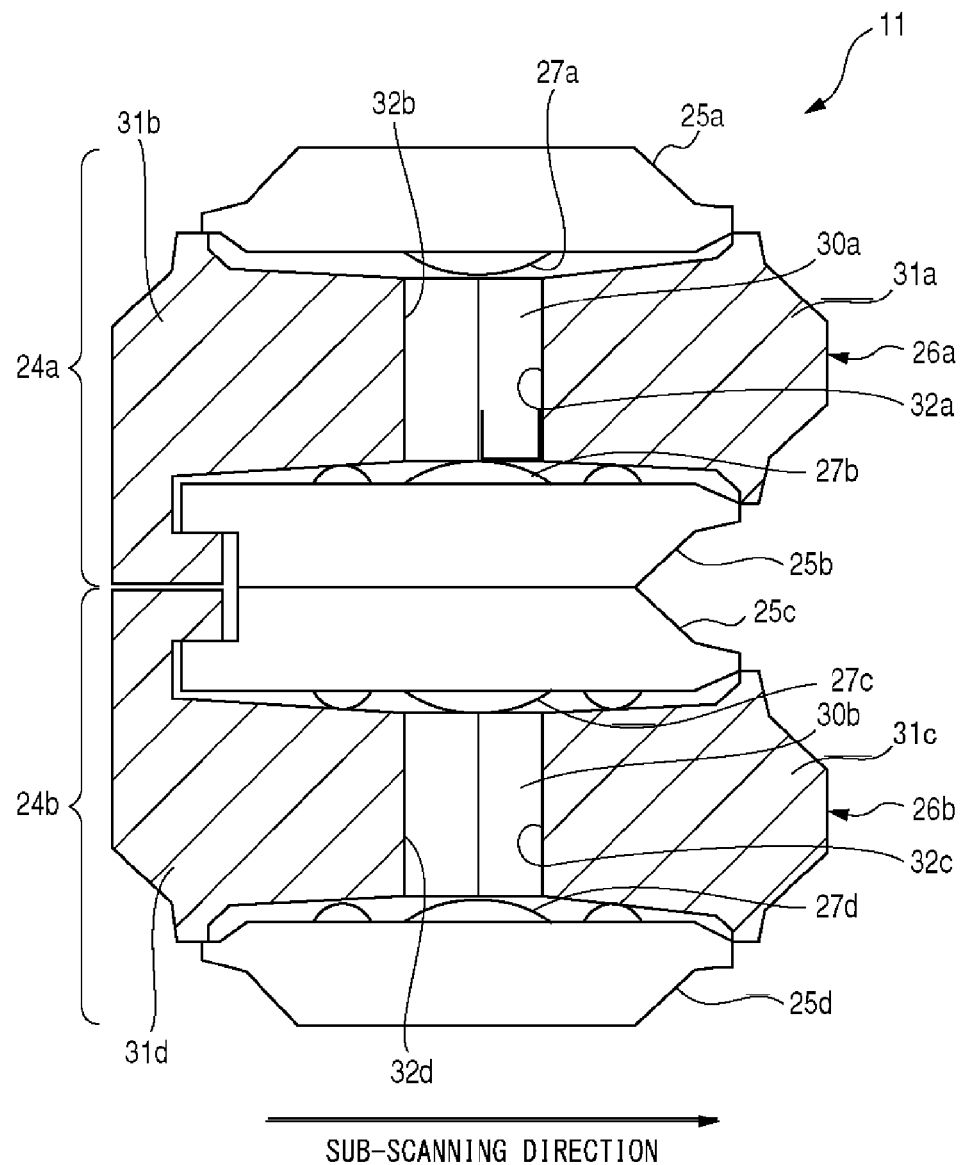
FIG. 2 shows a cross section of the erecting equal-magnification lens array in the sub-scanning direction.

FIG. 2 shows a cross section of the erecting equal-magnification lens array 11 in the sub-scanning direction. As shown in FIG. 2, the erecting equal-magnification lens array 11 comprises a stack of two lens array units including a first lens array unit 24a and a second lens array unit 24b. The first and second lens array units 24a and 24b have the identical structure.

The first lens array unit 24a is configured such that a first light shielding member 26a for shielding light is provided between a first lens array plate 25a and a second lens array plate 25b.

Each of the first lens array plate 25a and the second lens array plate 25b is a rectangular plate and is provided with a plurality of convex lenses on one side thereof. In other words, a plurality of first lenses 27a are linearly arranged in the main scanning direction (longitudinal direction) on the bottom surface (the surface facing the first light shielding member 26a) of the first lens array plate 25a, and a plurality of second lenses 27b are linearly arranged in the main scanning direction (longitudinal direction) on the top surface (the surface facing the first light shielding member 26a) of the second lens array plate 25b. According to the first embodiment, it is assumed that the first lenses 27a and the second lenses 27b are spherical in shape. Alternatively, the lenses may have aspherical shapes.

The first light shielding member 26a is a rectangular plate member as assembled into the array. A linear array of a plurality of first through holes 30a aligned with the first lenses 27a and the second lenses 27b are formed in the first light shielding member 26a in the longitudinal direction. The first through holes 30a are formed as circular, elliptical, or polygonal columns. The size of the opening thereof is smaller than or substantially identical to the size of the aperture of the first and second lenses 27a and 27b.

In a state where the first light shielding member 26a is sandwiched between the first and second lens array plates 25a and 25b, the first and second lenses 27a and 27b directly face the corresponding first through holes 30a. In this state, the optical axis of the corresponding first and second lenses 27a and 27b is aligned with the central axis of the axially symmetrical first through hole 30a. If the through hole is of a form in which the central axis cannot be defined, the requirement for coaxiality, as well as the requirement for form, may be determined at the discretion of a designer depending on the desired performance.

The first light shielding member 26a includes a first light shielding member piece 31a and a second light shielding member piece 31b produced by splitting the member 26a by a plane (referred to as a splitting plane) through the centers of the plurality of first through holes 30a. A first through hole piece 32a formed in the first light shielding member piece 31a and a second through hole piece 32b formed in the second light shielding member piece 31b are combined to form the first through hole 30a. The splitting plane may not pass through the centers of the first through holes 30a so long as the plane passes through both open ends of the plurality of first through holes 30a.

The second lens array unit 24b is configured such that a second light shielding member 26b for shielding light is provided between a third lens array plate 25c and a fourth lens array plate 25d.

Each of the third lens array plate 25c and the fourth lens array plate 25d is a rectangular plate and is provided with a plurality of convex lenses on one side thereof. In other words, a plurality of third lenses 27c are linearly arranged in the main scanning direction (longitudinal direction) on the bottom surface (the surface facing the second light shielding member 26b) of the third lens array plate 25c, and a plurality of fourth lenses 27d are linearly arranged in the main scanning direction (longitudinal direction) on the top surface (the surface facing the second light shielding member 26b) of the fourth lens array plate 25d. According to the first embodiment, it is assumed that the third lenses 27c and the fourth lenses 27d are spherical in shape. Alternatively, the lenses may have aspherical shapes.

The second light shielding member 26b is a rectangular plate member as assembled into the array. A linear array of a plurality of second through holes 30b aligned with the third lenses 27c and the fourth lenses 27d are formed in the second light shielding member 26b in the longitudinal direction. The second through holes 30b are formed as circular, elliptical, or polygonal columns. The size of the opening thereof is smaller than or substantially identical to the size of the aperture of the third and fourth lenses 27c and 27d.

In a state where the second light shielding member 26b is sandwiched between the third and fourth lens array plates 25c and 25d, the third and fourth lenses 27c and 27d directly face the corresponding second through hole 30b. In this state, the optical axis of the corresponding third and fourth lenses 27c and 27d is aligned with the central axis of the second through hole 30b. If the through hole is of a form in which the central axis cannot be defined, the requirement for coaxiality, as well as the requirement for form, may be determined at the discretion of a designer depending on the desired performance.

The second light shielding member 26b includes a third light shielding member piece 31c and a fourth light shielding member piece 31d produced by splitting the member 26b by a splitting plane through the centers of the plurality of second through holes 30b. A third through hole piece 32c formed in the third light shielding member piece 31c and a fourth through hole piece 32d formed in the fourth light shielding member piece 31d are combined to form the second through hole 30b. The splitting plane may not pass through the centers of the second through holes 30b so long as the plane passes through both open ends of the plurality of second through holes 30b.

The first and second lens array units 24a and 24b structured as described above are stacked such that the surface of the second lens array plate 25b not formed with convex lenses and the surface of the third lens array plate 25c not formed with convex lenses face each other. The first lens 27a, the second lens 27b, the third lens 27c, and the fourth lens 27d aligned with each other in the stack form a coaxial lens system.

The erecting equal-magnification lens array 11 is fitted in the second recess 12b of the housing 12 such that the first lens array plate 25a faces the glass plate 14 and the fourth lens array plate 25d faces the linear image sensor 20. FIG. 2 shows that the second lens array plate 25b and the third lens array plate 25c are in contact. In practice, however, an optical system may comprise a stack including one of the first lens array plate 25a and the second lens array plate 25b of the first lens array unit 24a and one of the third lens array plate 25c and the fourth lens array plate 25d of the second lens array unit 24b in contact with each other. The designer may select a configuration as desired.

FIGS. 3A-3D show a method of forming the lens array unit according to the first embodiment. Since the first and second lens array units 24a and 24b have the identical structure, the first lens array unit 24a will be described by way of example.

Figure 3A:
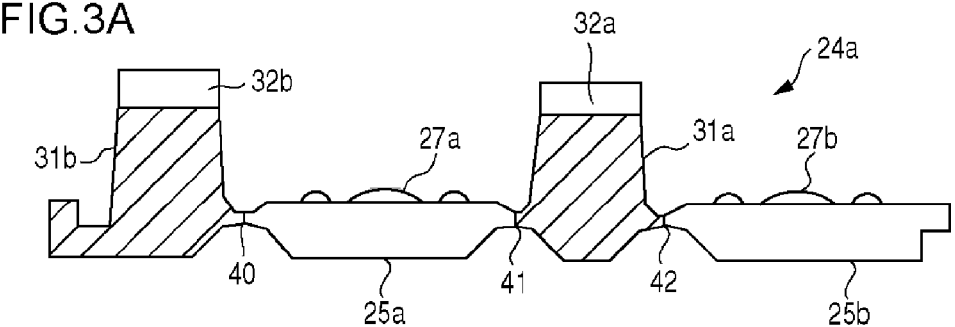
FIGS. 3A-3D show a method of forming the lens array unit according to the first embodiment.

FIG. 3A shows the first step of assembling the first lens array unit 24a. In the first step, a component in which the first lens array plate 25a, the second lens array plate 25b, the first light shielding member piece 31a, and the second light shielding member piece 31b are integrated is prepared, as shown in FIG. 3A. For ease of understanding, FIG. 4 shows a perspective view of the first lens array unit 24a in the first step.

Figure 4:
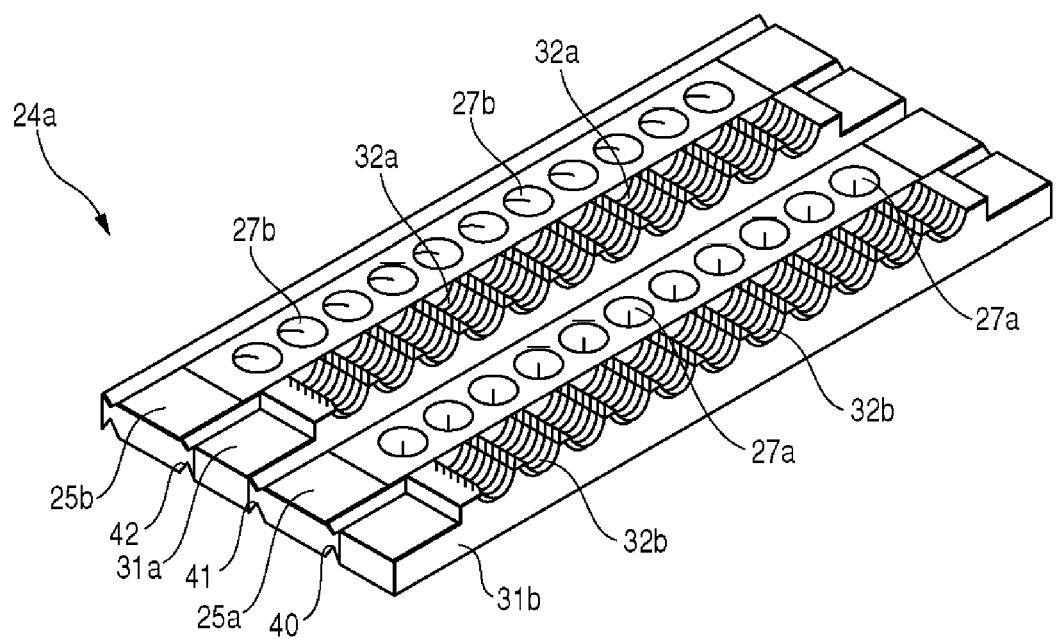
FIG. 4 is a perspective view of the first lens array unit in the first step shown in FIG. 3A.

As shown in FIG. 3A and FIG. 4, one end of the first lens array plate 25a in the sub-scanning direction is joined to one end of the second light shielding member piece 31b in the sub-scanning direction via a first joint 40. The other end of the first lens array plate 25a in the sub-scanning direction is joined to one end of the first light shielding member piece 31a in the sub-scanning direction via a second joint 41. The other end of the first light shielding member piece 31a in the sub-scanning direction is joined to one end of the second lens array plate 25b in the sub-scanning direction via a third joint 42.

The first lens array unit 24a may be formed by two-color injection molding in which a light transmitting material is used for the first and second lens array plates 25a and 25b, and a light shielding material is used for the first and second light shielding member pieces 31a and 31b. Preferably, the light transmitting material has high light transmittance in a desired wavelength range and has low water absorption. Desired materials include cycloolefin resins, olefin resins, norbornene resins, and polycarbonate. Preferably, the light shielding material is amenable to injection molding and is highly capable of shielding light in a required wavelength band. For example, the light shielding material may be a black ABS resin.

Alternatively, the first lens array unit 24a may be formed by initially forming the first and second lens array plates 25a and 25b and first and second light shielding member pieces 31a and 31b by injection molding of a light transmitting material, and then printing or coating only the first and second light shielding member pieces 31a and 31b with black ink or black paint.

Figure 3B:
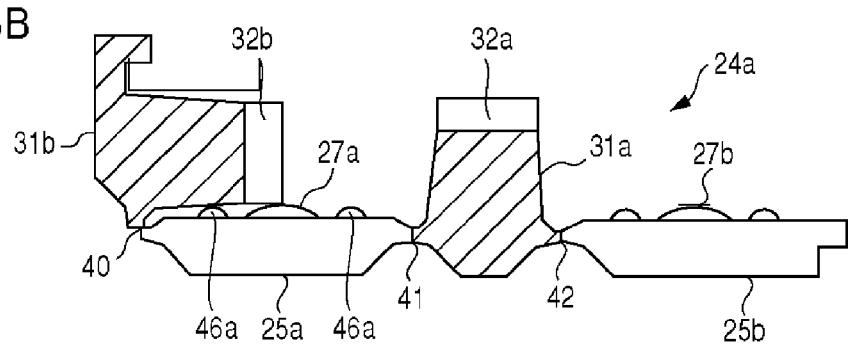

FIG. 3B shows the second step of assembling the first lens array unit 24a. In the second step, the first joint 40 joining the first lens array plate 25a and the second light shielding member piece 31b is bent so that the second through hole piece 32b directly faces the first lens 27a.

Figure 3C:
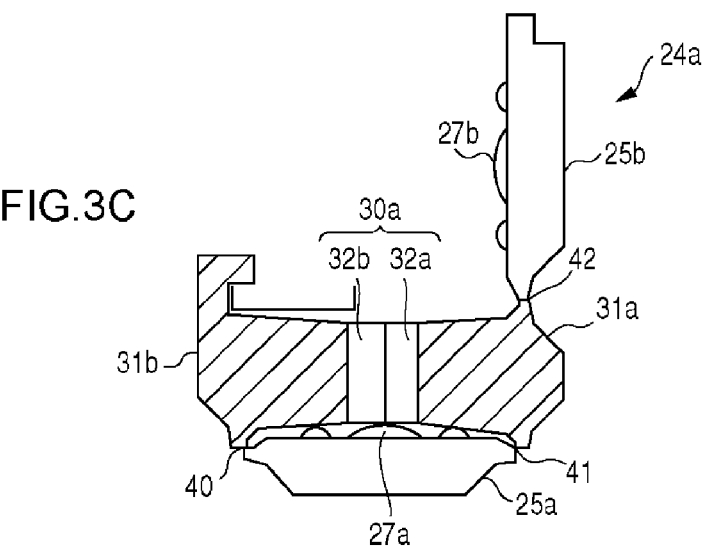

FIG. 3C shows the third step of assembling the first lens array unit 24a. In the third step, the second joint 41 joining the first lens array plate 25a and the first light shielding member piece 31a is bent so that the first through hole piece 32a directly faces the first lens 27a. The first and second through hole pieces 32a and 32b form the first through hole 30a directly facing the first lens 27a.

In the first embodiment, a first gap adjustment part 46a is formed on the surface of the first lens array plate 25a where the first lens 27a is formed. The first gap adjustment part 46a has the function of defining the distance between the first lens 27a and the first through hole 30a.

Figure 3D:
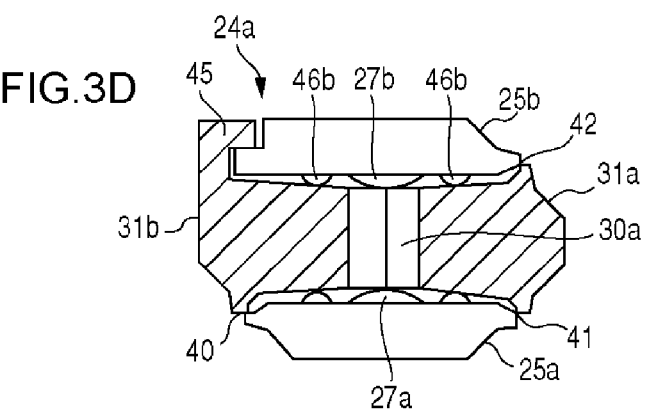
Figure 5:
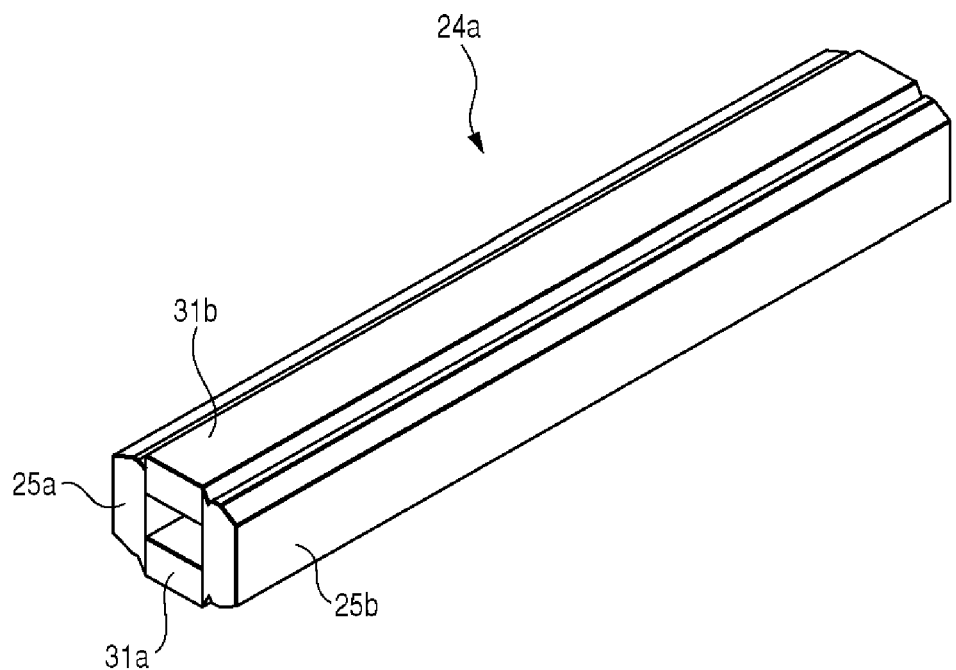
FIG. 5 is a perspective view of the first lens array unit in the fourth step shown in FIG. 3D.

FIG. 3D shows the fourth step of assembling the first lens array unit 24a. In the fourth step, the third joint 42 joining the first light shielding member piece 31a and the second lens array plate 25b is bent so that the second lens 27b directly faces the first through hole 30a. For ease of understanding, FIG. 5 shows a perspective view of the first lens array unit 24a in the fourth step.

In the first embodiment, a second gap adjustment part 46b is formed on the surface of the second lens array plate 25b where the second lens 27b is formed. The second gap adjustment part 46b has the function of defining the distance between the second lens 27b and the first through hole 30a.

In the first embodiment, a latch part 45 is formed at the end of the second light shielding member piece 31b in the sub-scanning direction opposite to the first joint 40. By engaging the end of the second lens array plate 25b in the sub-scanning direction opposite to the third joint 42 with the latch part 45, the assembled state of the first lens array unit 24a is maintained.

As described above, the lens array unit of the erecting equal-magnification lens array 11 according to the first embodiment is built by forming the two lens array plates and the two light shielding member pieces as one piece and bending the joints between the components. Since the number of components is reduced and the lens array is built easily by merely bending the joints, the number of steps of assembly can be reduced. As a result, the cost of the lens array unit can be reduced.

Since the lens array plate and the light shielding member of the lens array unit according to the first embodiment can be formed of the same material, the amount of thermal expansion and contraction will be uniform. Accordingly, the optical performance is prevented from becoming poor due to thermal expansion or contraction.

Since the cylindrical through hole of the lens array unit according to the first embodiment is configured as two split through hole pieces, the shape of the through hole can be designed as desired.

For example, as shown in FIG. 4, a groove may be formed on the inner wall of the first through hole piece 32a and the second through hole piece 32b. By forming a groove on the inner wall of the through hole, light impinging upon the inner wall is scattered so that stray light is reduced. The groove can be easily formed by changing the shape of the mold used in injection molding. In the case of a through hole that is not split, it is not easy to form a groove on the inner wall of the through hole. This is because it is not possible to extract the pin of the mold for forming through hole from the light shielding member if a groove is formed on the inner wall of the through hole.

According to the first embodiment, the through holes are formed as circular, elliptical, or polygonal columns. By splitting a through hole into two through hole pieces, it will be possible to form the through hole in the shape of a circular truncated cone, elliptical truncated cone, polygonal truncated cone, barrel, or bellows, or to form a plurality of concavities and convexities or grooves in the through holes. These shapes are by example only and are non-limiting. By increasing the flexibility of design of the shape of the inner wall, improvement in optical performance is expected. For example, stray light can be reduced more effectively in an optical system in which the inner wall of the through hole is defined as a light shielding wall.

If the erecting equal-magnification lens array is configured as a stack of the first lens array unit 24a and the second lens array unit 24b, as shown in FIG. 2, the area between convex lenses where a light beam passes can be surrounded by the light shielding wall so that stray light can be suitably reduced and propagation of stray light to the linear image sensor can be prevented.

In the erecting equal-magnification lens array 11 shown in FIG. 2, convex lenses may be formed on the top surface of the first lens array plate 25a, the top surface of the second lens array plate 25b, the top surface of the third lens array plate 25c, and the bottom surface of the fourth lens array plate 25d. This will result in a brighter optical system.

In the first embodiment shown in FIG. 2, the optical system is formed by building a stack of the first lens array unit and the second lens array unit in contact with each other. Alternatively, the units may be spaced apart from each other. In this case, scratch damage due to the contact between the two lens array plates is prevented. In the erecting equal-magnification lens array, the surface of contact between the second lens array plate 25b and the third lens array plate 25c shown in FIG. 2 will be the position of convergence of light beam. Thus, damage or contamination on the contact surface will create a clear image of damage or contamination on the imaging plane and severely reduce the optical performance. A gap provided between the second lens array plate 25b and the third lens array plate 25c will locate the position of beam convergence in the space and prevents reduction in the optical performance.

The two lens array plates and two light shielding member pieces according to the embodiment are described as being formed as one piece. Alternatively, a desired number of lens array plates and light shielding member pieces may be formed as one piece depending on the design of the optical system.

According to the first embodiment, a stack of two lens array units is used to form an erect equal-magnification image. The optical system may also include a stack of three or more lens array units. Alternatively, only one lens array unit may be used to form an optical system such as an erect equal-magnification optical system. This will further reduce the manufacturing cost and provide more inexpensive erect equal-magnification lens array units or lens units of other optical specifications. The number of units can be selected according to the optical specification sought to be provided by the designer.

Figure 6:
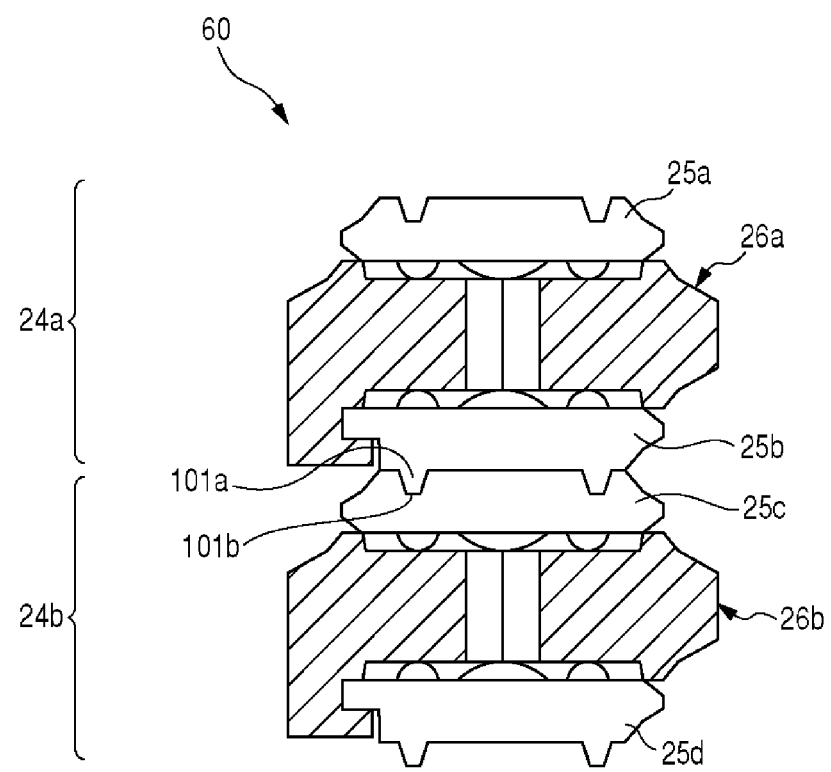
FIG. 6 shows a cross section of the erecting equal-magnification lens array according to the second embodiment.

FIG. 6 shows a cross section of the erecting equal-magnification lens array according to the second embodiment. Those components of the erecting equal-magnification lens array 60 shown in FIG. 6 that are identical or corresponding to components of the erecting equal-magnification lens array 11 according to the first embodiment are represented by the same reference symbols and the description is omitted as appropriate.

An optical system including a stack of two lens array units may be built such that concavities and convexities for alignment may be provided in the portion of contact of the lens array units or in selected areas in the neighborhood of the portion of contact, for the purpose of aligning the optical axes of the units. In the erecting equal-magnification lens array 60 shown in FIG. 6, the concavity and convexity provided on the second lens array plate 25b of the first lens array unit 24a and on the third lens array plate 25c of the second lens array unit 24b achieve highly precise alignment. In the illustrated example, a convexity 101a is provided on the surface of the second lens array plate 25b facing the third lens array plate 25c, and a concavity 101b corresponding to the convexity is provided on the surface of the third lens array plate 25c facing the second lens array plate 25b. These concavity and convexity may be elongated in the main scanning direction or formed as spots. A skilled person will understand that the concavity and convexity should not be located or shaped so as to block a light beam through the lenses or cause stray light.

Figure 7:
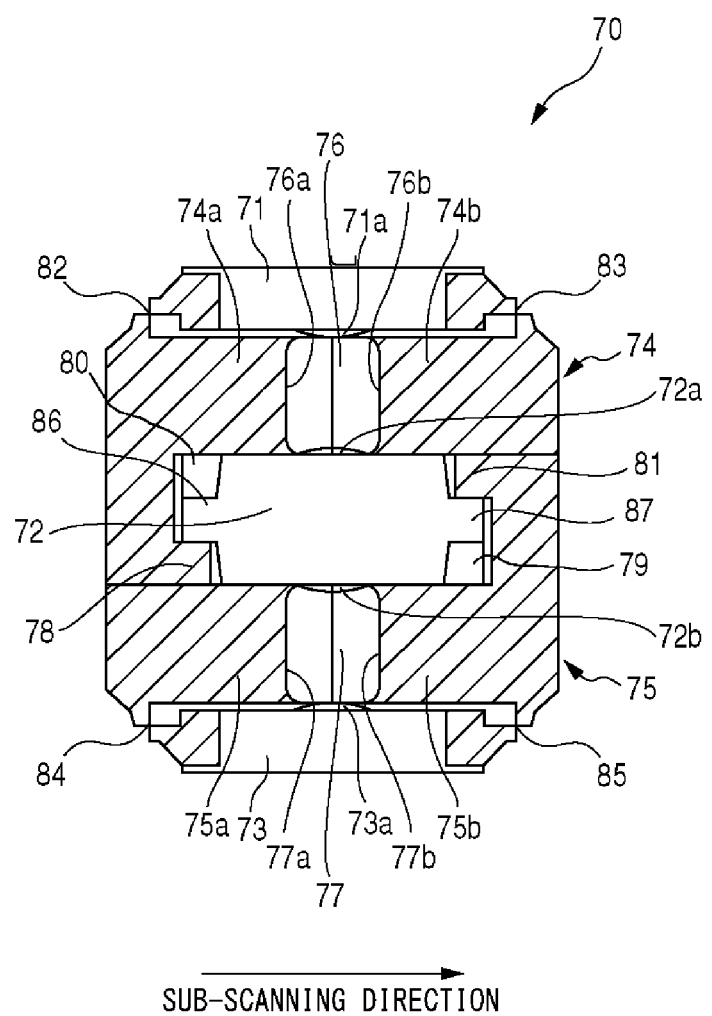
FIG. 7 shows the erecting equal-magnification lens array according to the third embodiment of the present invention.
Figure 8:
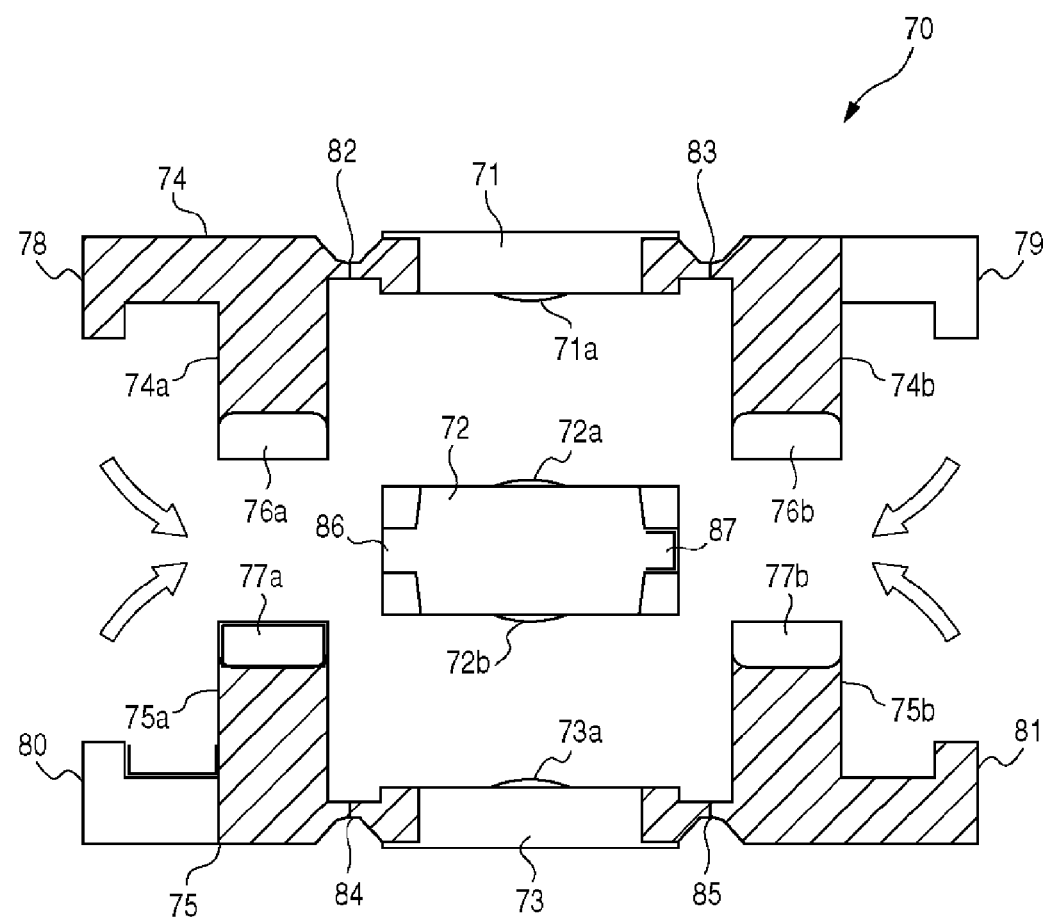
FIG. 8 is an exploded view of the erecting equal-magnification lens array according to the third embodiment of the present invention.

FIG. 7 shows the erecting equal-magnification lens array according to the third embodiment of the present invention. FIG. 8 is an exploded view of the erecting equal-magnification lens array according to the third embodiment of the present invention.

As shown in FIG. 7, an erecting equal-magnification lens array 70 according to the third embodiment comprises a stack of a first lens array plate 71, a second lens array plate 72, and a third lens array plate 73. A first light shielding member 74 is provided between the first lens array plate 71 and the second lens array plate 72, and a second light shielding member 75 is provided between the second lens array plate 72 and the third lens array plate 73.

The first lens array plate 71 is a rectangular plate. A linear arrangement of a plurality of first lenses 71a is formed on one surface (bottom surface) of the plate 71 in the main scanning direction. The first light shielding member 74 is provided with a plurality of first through holes 76 formed in the main scanning direction. The first light shielding member 74 includes a first light shielding member piece 74a and a second light shielding member piece 74b produced by splitting the member 74 by a splitting plane through the centers of the plurality of first through holes 76. The first light shielding member piece 74a is provided with a first through hole piece 76a and the second light shielding member piece 74b is provided with a second through hole piece 76b. The splitting plane may not pass through the centers of the first through holes 76 so long as the plane passes through both open ends of the plurality of first through holes 76.

In the third embodiment, the first lens array plate 71 and the first light shielding member 74 are formed as one piece. In other words, one end of the first lens array plate 71 in the sub-scanning direction is joined to one end of the first light shielding member piece 74a via a first joint 82 so as to form the lens array unit. A first latch part 78 is formed at the end of the first light shielding member piece 74a in the sub-scanning direction opposite to the first joint 82. The other end of the first lens array plate 71 in the sub-scanning direction is joined to one end of the second light shielding member piece 74b in the sub-scanning direction via a second joint 83. A second latch part 79 is formed at the end of the second light shielding member piece 74b in the sub-scanning direction opposite to the second joint 83. In the third embodiment, by bending the first joint 82 and the second joint 83, the first through hole piece 76a and the second through hole piece 76b are assembled, and the first through hole 76 is formed such that one opening thereof directly faces the first lens 71a.

The third lens array plate 73 and the second light shielding member 75 are also configured similarly as the first lens array plate 71 and the first light shielding member 74. In other words, the third lens array plate 73 is a rectangular plate. A linear arrangement of a plurality of fourth lenses 73a is formed on one surface (top surface) of the plate 73 in the main scanning direction. The second light shielding member 75 is provided with a plurality of second through holes 77 formed in the main scanning direction. The second light shielding member 75 includes a third light shielding member piece 75a and a fourth light shielding member piece 75b produced by splitting the member 75 by a splitting plane through the centers of the plurality of second through holes 77. The third light shielding member piece 75a is provided with a third through hole piece 77a and the fourth light shielding member piece 75b is provided with a fourth through hole piece 77b. The splitting plane may not pass through the centers of the second through holes 77 so long as the plane passes through both open ends of the plurality of second through holes 77.

The third lens array plate 73 and the second light shielding member 75 are formed as one piece. In other words, one end of the third lens array plate 73 in the sub-scanning direction is joined to one end of the third light shielding member piece 75a in the sub-scanning direction via a third joint 84 so as to form the lens array unit. A third latch part 80 is formed at the end of the third light shielding member piece 75a in the sub-scanning direction opposite to the third joint 84. The other end of the third lens array plate 73 in the sub-scanning direction is joined to one end of the fourth light shielding member piece 75b in the sub-scanning direction via a fourth joint 85. A fourth latch part 81 is formed at the end of the fourth light shielding member piece 75b in the sub-scanning direction opposite to the fourth joint 85. In the third embodiment, by bending the third joint 84 and the fourth joint 85, the third through hole piece 77a and the fourth through hole piece 77b are assembled, and the second through hole 77 is formed such that one opening thereof directly faces the fourth lens 73a.

The second lens array plate 72 is a rectangular plate. A linear arrangement of a plurality of second lenses 72a is formed on one surface (top surface) of the plate 72 in the main scanning direction, and a linear arrangement of a plurality of third lenses 72b is formed on the other surface (bottom surface) of the plate 72 in the main scanning direction. A first convexity 86 and a second convexity 87 are formed at the ends of the second lens array plate 72 in the sub-scanning direction.

As shown in FIG. 7, the erecting equal-magnification lens array 70 is built by building a stack of the first lens array plate 71, the second lens array plate 72, and the third lens array plate 73 such that the second lens 72a is located to directly face the opening of the first through hole 76 and the third lens 72b is located to directly face the opening of the second through hole 77. When the erecting equal-magnification lens array 70 is built, the first latch part 78 and the third latch part 80 are engaged with the first convexity 86 of the second lens array plate 72, and the second latch part 79 and the fourth latch part 81 are engaged with the second convexity 87 of the second lens array plate 72. This maintains the assembled state of the erecting equal-magnification lens array 70.

As in the first embodiment, the erecting equal-magnification lens array 70 according to the third embodiment is built by forming the lens array plates and the light shielding member pieces as one piece and bending the joints between the components. Since the number of components is reduced and the lens array is built easily by merely bending the joints, the number of steps of assembly can be reduced. Consequently, the cost of the erecting equal-magnification lens array 70 can be reduced.

In the third embodiment, as in the first embodiment, a gap adjustment part for defining the distance between the lens and the through hole may be formed in the lens array plate. In other words, a first gap adjustment part for defining the distance between the first lens 71a and the first through hole 76 may be formed on the surface of the first lens array plate 71 where the first lens 71a is formed. Further, a second gap adjustment part for defining the distance between the second lens 72a and the first through hole 76 may be formed on the surface of the second lens array plate 72 where the second lens 72a is formed. Further, a third gap adjustment part for defining the distance between the third lens 72b and the second through hole 77 may be formed on the surface of the second lens array plate 72 where the third lens 72b is formed. Further, a fourth gap adjustment part for defining the distance between the fourth lens 73a and the second through hole 77 may be formed on the surface of the third lens array plate 73 where the fourth lens 73a is formed.

Figure 9:
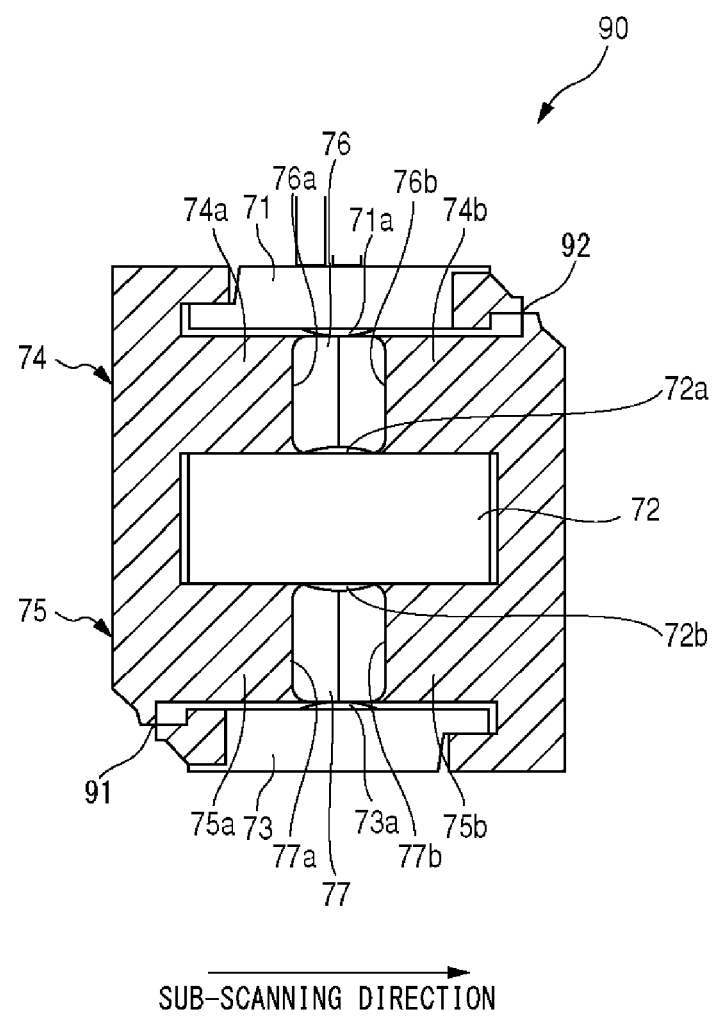
FIG. 9 shows the erecting equal-magnification lens array according to the fourth embodiment of the present invention.
Figure 10:
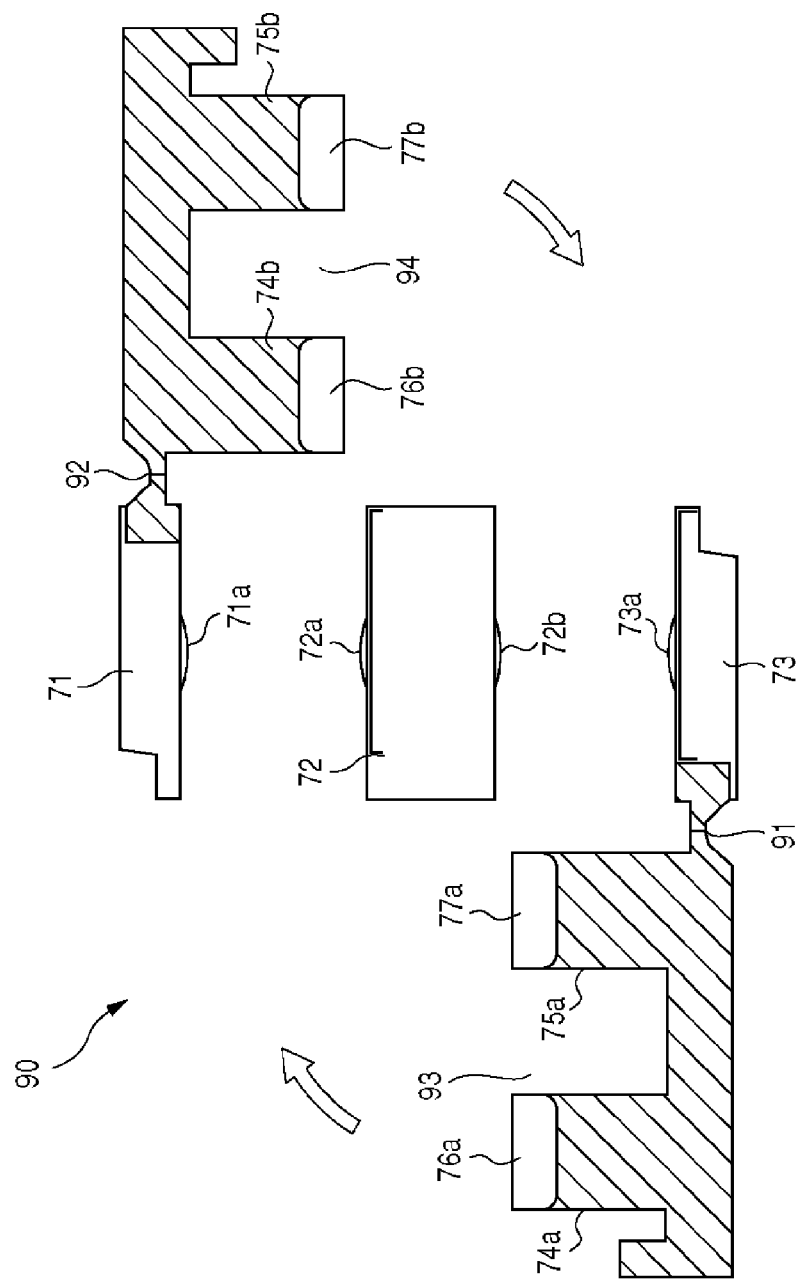
FIG. 10 is an exploded view of the erecting equal-magnification lens array according to the fourth embodiment of the present invention.

FIG. 9 shows the erecting equal-magnification lens array according to the fourth embodiment of the present invention. FIG. 10 is an exploded view of the erecting equal-magnification lens array according to the fourth embodiment of the present invention. As in the erecting equal-magnification lens array 70 according to the third embodiment, an erecting equal-magnification lens array 90 shown in FIGS. 9 and 10 comprises a stack of a first lens array plate 71, a second lens array plate 72, and a third lens array plate 73. A first light shielding member 74 is provided between the first lens array plate 71 and the second lens array plate 72, and a second light shielding member 75 is provided between the second lens array plate 72 and the third lens array plate 73. Those components of the erecting equal-magnification lens array 90 that are identical or corresponding to components of the erecting equal-magnification lens array 70 according to the third embodiment are represented by the same reference symbols and the description is omitted as appropriate.

The erecting equal-magnification lens array 90 according to the fourth embodiment differs from the erecting equal-magnification lens array 70 according to the third embodiment in respect of way that the first and second light shielding members 74 and 75 are split. In the erecting equal-magnification lens array 90, the first and third light shielding member pieces 74a and 75a located at one end in the sub-scanning direction are formed as one piece, and the second and fourth light shielding member pieces 74b and 75b located at the other end in the sub-scanning direction are formed as one piece. The first and third light shielding member pieces 74a and 75a formed as one piece and one end of the third lens array plate 73 in the sub-scanning direction are joined via a first joint 91 so as to form the lens array unit. The second and fourth light shielding member pieces 74b and 75b formed as one piece and one end of the first lens array plate 71 in the sub-scanning direction are joined via a second joint 92 so as to form the lens array unit.

To build the erecting equal-magnification lens array 90, the first joint 91 is bent so that the third through hole piece 77a directly faces the half of the fourth lens 73a. Further, the second joint 92 is bent so that the second through hole piece 76b directly faces the half of the first lens 71a. The erecting equal-magnification lens array 90 is assembled by inserting the second lens array plate 72 in a recess 93 formed between the first light shielding member piece 74a and the third light shielding member piece 75a and in a recess 94 formed between the second light shielding member piece 74b and the fourth light shielding member piece 75b.

As in the first embodiment, the erecting equal-magnification lens array 90 according to the fourth embodiment is built by forming the lens array plates and the light shielding member pieces as one piece and bending the joints between the components. Since the number of components is reduced and the lens array is built easily by merely bending the joints, the number of steps of assembly can be reduced. Consequently, the cost of the erecting equal-magnification lens array 90 can be reduced.

In the fourth embodiment, as in the first embodiment, a gap adjustment part for defining the distance between the second lens and the through hole may be formed.

Figure 11:
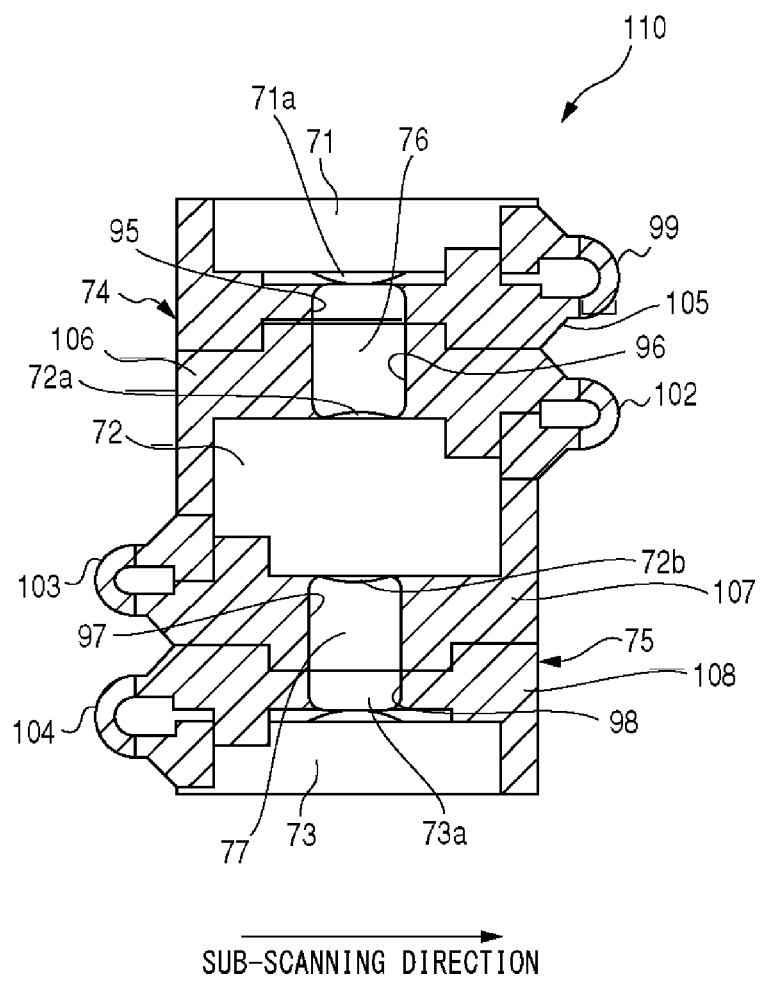
FIG. 11 shows the erecting equal-magnification lens array according to the fifth embodiment of the present invention.
Figure 12:
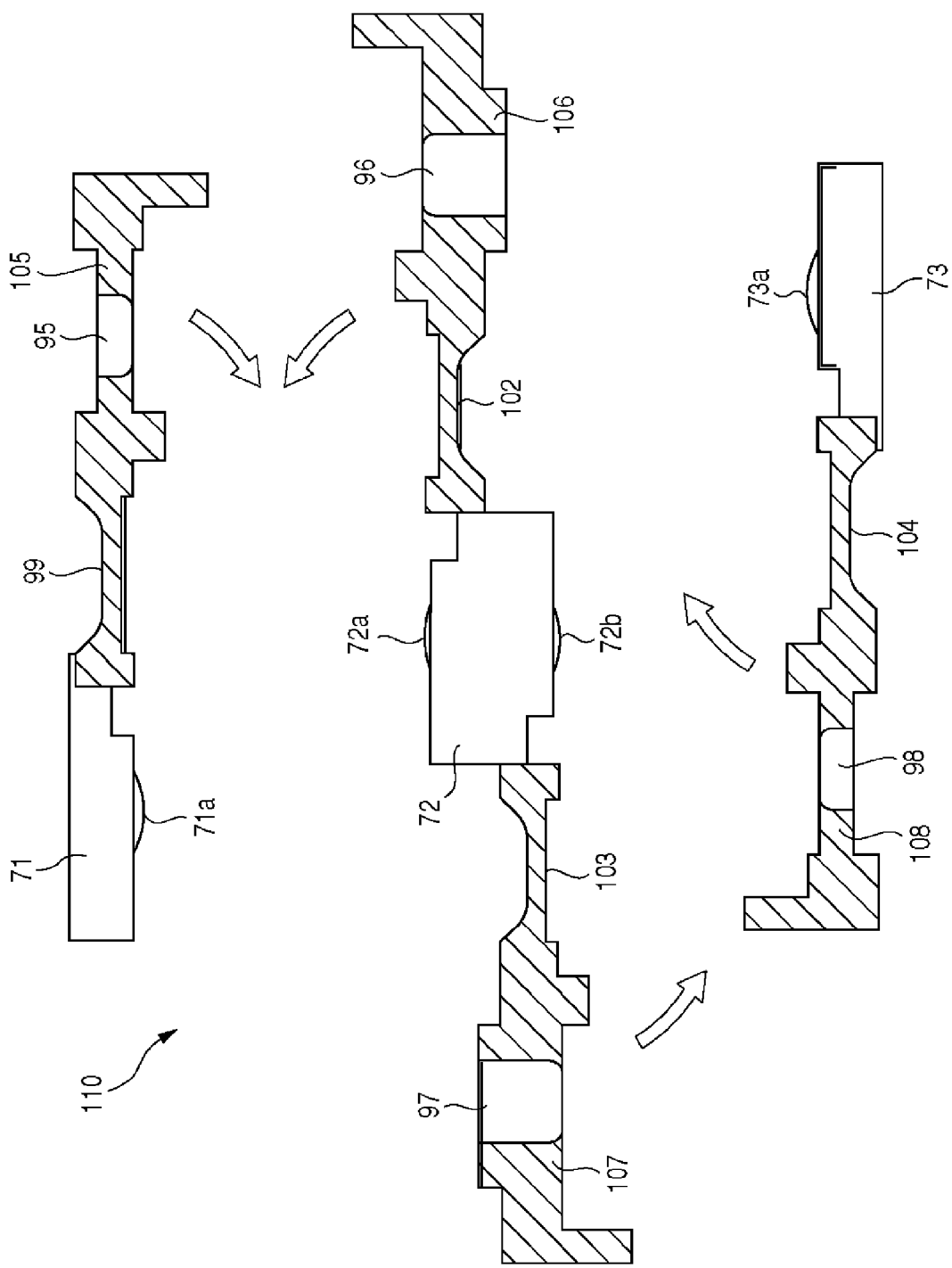
FIG. 12 is an exploded view of the erecting equal-magnification lens array according to the fifth embodiment of the present invention.

FIG. 11 shows the erecting equal-magnification lens array according to the fifth embodiment of the present invention. FIG. 12 is an exploded view of the erecting equal-magnification lens array according to the fifth embodiment of the present invention. As in the erecting equal-magnification lens array according to the third embodiment, an erecting equal-magnification lens array 110 shown in FIGS. 11 and 12 comprises a stack of a first lens array plate 71, a second lens array plate 72, and a third lens array plate 73. A first light shielding member 74 is provided between the first lens array plate 71 and the second lens array plate 72, and a second light shielding member 75 is provided between the second lens array plate 72 and the third lens array plate 73. Those components of the erecting equal-magnification lens array 110 that are identical or corresponding to components of the erecting equal-magnification lens array 70 according to the third embodiment are represented by the same reference symbols and the description is omitted as appropriate.

In the fifth embodiment, the first and second light shielding members 74 and 75 are split by a plane parallel to the sub-scanning direction. In other words, the first light shielding member 74 is split into a first light shielding member piece 105 and a second light shielding member piece 106, and the second light shielding member 75 is split into a third light shielding member piece 107 and a fourth light shielding member piece 108. A first through hole piece 95 is formed in the first light shielding member piece 105, a second through hole piece 96 is formed in the second light shielding member piece 106, a third through hole piece 97 is formed in the third light shielding member piece 107, and a fourth through hole piece 98 is formed in the fourth light shielding member piece 108. The splitting plane may not necessarily be parallel to the sub-scanning direction so long as the plane intersects the central axes of a plurality of through holes.

In the fifth embodiment, the first light shielding member piece 105 and one end of the first lens array plate 71 in the sub-scanning direction are joined via a first joint 99 so as to form the lens array unit. Further, the second lens array plate 72, the second light shielding member piece 106, and the third light shielding member piece 107 are formed as one piece so as to form the lens array unit. In other words, the second light shielding member piece 106 and one end of the second lens array plate 72 in the sub-scanning direction are joined via a second joint 102, and the third light shielding member piece 107 and the other end of the second lens array plate 72 in the sub-scanning direction are joined via a third joint 103. Further, the fourth light shielding member piece 108 and one end of the third lens array plate 73 in the sub-scanning direction are joined via a fourth joint 104 so as to form the lens array unit. In the fifth embodiment, the first joint 99, the second joint 102, the third joint 103, and the fourth joint 104 are formed to be thin and elongated in the sub-scanning direction so that the joints can be bent easily.

To build the erecting equal-magnification lens array 110, the first joint 99 is bent so that the first through hole piece 95 directly faces the first lens 71a of the first lens array plate 71. The second joint 102 is bent so that the second through hole piece 96 directly faces the second lens 72a of the second lens array plate 72. The third joint 103 is bent so that the third through hole piece 97 directly faces the third lens 72b of the second lens array plate 72. The fourth joint 104 is bent so that the fourth through hole piece 98 directly faces the fourth lens 73a of the third lens array plate 73. Subsequently, the erecting equal-magnification lens array 110 is built by building a stack of the first lens array plate 71, the second lens array plate 72, and the third lens array plate 73 such that the first and second through hole pieces 95 and 96 are coupled vertically to form the first through hole 76, and the third and fourth through hole pieces 97 and 98 are coupled vertically to form the second through hole 77.

As in the first embodiment, the erecting equal-magnification lens array 110 according to the fifth embodiment is built by forming the lens array plates and the light shielding member pieces as one piece and bending the joints between the components. Since the number of components is reduced and the lens array is built easily by merely bending the joints, the number of steps of assembly can be reduced. Consequently, the cost of the erecting equal-magnification lens array 110 can be reduced.

In the fifth embodiment, as in the first embodiment, a gap adjustment part for defining the distance between the lens and the through hole may be formed in the lens array plate.

Figure 13:
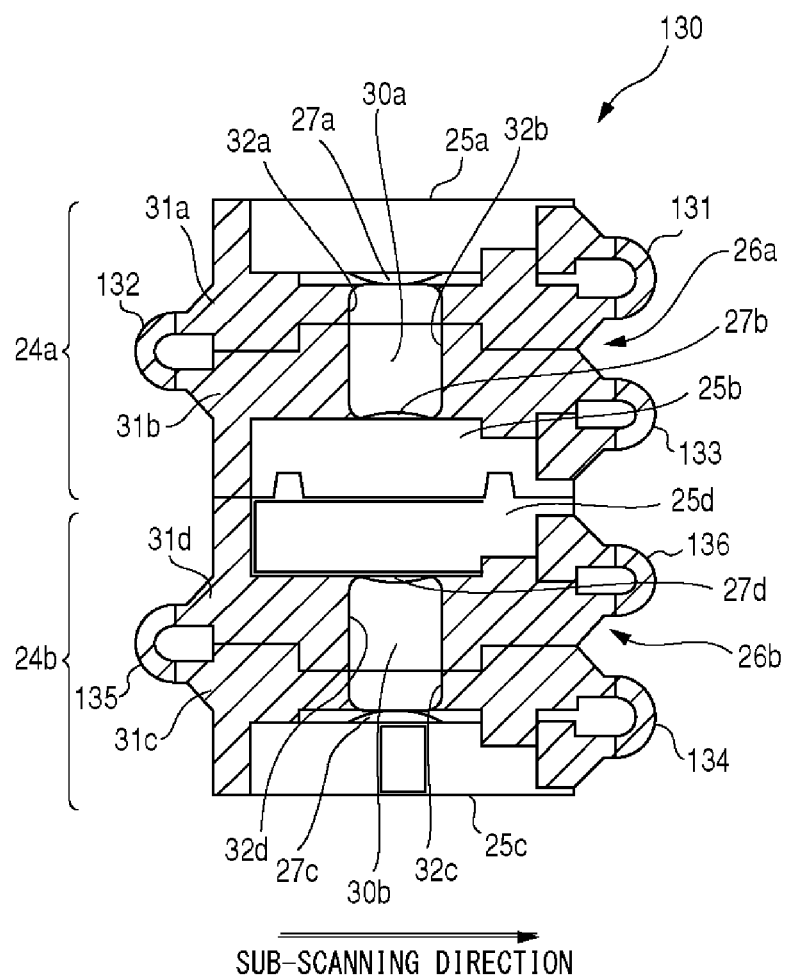
FIG. 13 shows the erecting equal-magnification lens array according to the sixth embodiment of the present invention.
Figure 14:
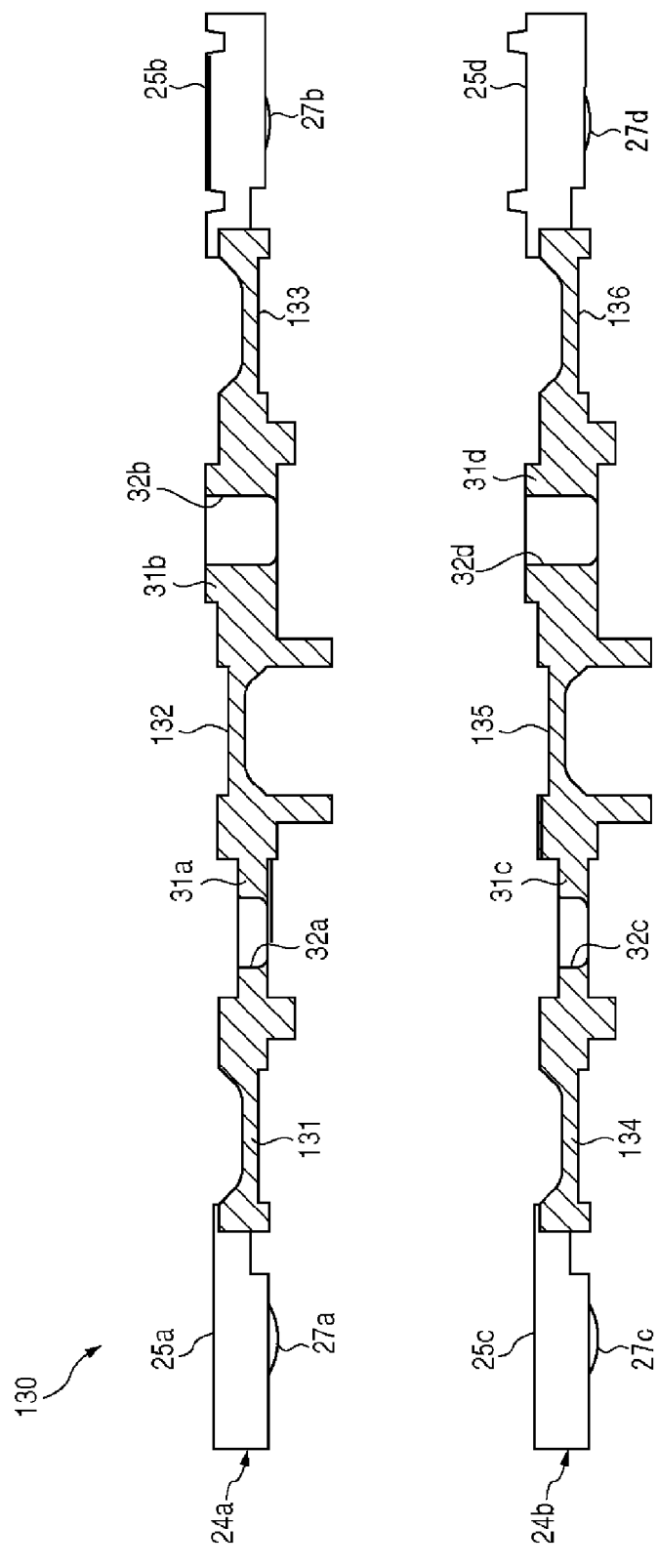
FIG. 14 is an exploded view of the erecting equal-magnification lens array according to the sixth embodiment of the present invention.

FIG. 13 shows the erecting equal-magnification lens array according to the sixth embodiment of the present invention. FIG. 14 is an exploded view of the erecting equal-magnification lens array according to the sixth embodiment of the present invention. As in the erecting equal-magnification lens array according to the first embodiment, an erecting equal-magnification lens array 130 shown in FIGS. 13 and 14 comprises a stack of two lens array units including a first lens array unit 24a and a second lens array unit 24b. Those components of the erecting equal-magnification lens array 130 that are identical or corresponding to components of the erecting equal-magnification lens array 11 according to the first embodiment are represented by the same reference symbols and the description is omitted as appropriate.

The erecting equal-magnification lens array 130 according to the sixth embodiment differs from the erecting equal-magnification lens array 11 according to the first embodiment in respect of way that the first and second light shielding members 26a and 26b are split. The first light shielding member 26a of the erecting equal-magnification lens array 130 is split by a plane parallel to the sub-scanning direction into a first light shielding member piece 31a and a second light shielding member piece 31b. The second light shielding member 26b is split by a plane parallel to the sub-scanning direction into a third light shielding member piece 31c and a fourth light shielding member piece 31d. A first through hole piece 32a is formed in the first light shielding member piece 31a, a second through hole piece 32b is formed in the second light shielding member piece 31b, a third through hole piece 32c is formed in the third light shielding member piece 31c, and a fourth through hole piece 32d is formed in the fourth light shielding member piece 31d. The splitting plane may not necessarily be parallel to the sub-scanning direction so long as the plane intersects the central axes of a plurality of through holes.

As shown in FIG. 14, one end of the first lens array plate 25a of the first lens array unit 24a in the sub-scanning direction is joined to one end of the first light shielding member piece 31a in the sub-scanning direction via a first joint 131. The other end of the first light shielding member piece 31a is joined to one end of the second light shielding member piece 31b in the sub-scanning direction via a second joint 132. The other end of the second light shielding member piece 31b in the sub-scanning direction is joined to one end of the second lens array plate 25b in the sub-scanning direction via a third joint 133. The first lens array plate 25a, the first and second light shielding member pieces 31a and 31b, and the second lens array plate 25b of the first lens array unit 24a are formed as one piece.

One end of the third lens array plate 25c of the second lens array unit 24b in the sub-scanning direction is joined to one end of the third light shielding member piece 31c in the sub-scanning direction via a fourth joint 134. The other end of the third light shielding member piece 31c is joined to one end of the fourth light shielding member piece 31d in the sub-scanning direction via a fifth joint 135. The other end of the fourth light shielding member piece 31d in the sub-scanning direction is joined to one end of the fourth lens array plate 25d in the sub-scanning direction via a sixth joint 136. The third lens array plate 25c, the third and fourth light shielding member pieces 31c and 31d, and the fourth lens array plate 25d of the second lens array unit 24b are formed as one piece.

To build the erecting equal-magnification lens array 130, the first and second lens array units 24a and 24b are assembled. More specifically, the first lens array unit 24a is built by bending the first through third joints 131-133 such that the first lens 27a is located to directly face one opening of the first through hole 30a and the second lens 27b is located to directly face the other opening of the first through hole 30a. Further, the second lens array unit 24b is built by bending the fourth through sixth joints 134-136 such that the third lens 27c is located to directly face one opening of the second through hole 30b and the fourth lens 27d is located to directly face the other opening of the second through hole 30b. Subsequently, the erecting equal-magnification lens array 130 is built by building a stack of the first and second lens array units 24a and 24b such that the surface of the second lens array plate 25b not formed with lenses and the surface of the fourth lens array plate 25d not formed with lenses face each other. In the embodiment shown in FIG. 13, the optical system is formed by building a stack of the first lens array unit and the second lens array unit in contact with each other. Alternatively, the units may be spaced apart from each other.

As described above, the erecting equal-magnification lens array 130 according to the sixth embodiment is built by forming the two lens array plates and the two light shielding member pieces as one piece and bending the joints between the components. Since the number of components is reduced and the lens array is built easily by merely bending the joints, the number of steps of assembly can be reduced.

In the erecting equal-magnification lens array 130 according to the sixth embodiment, the concavity and convexity provided on the second lens array plate 25b of the first lens array unit 24a and on the fourth lens array plate 25d of the second lens array unit 24b achieve highly precise alignment.

In the sixth embodiment, as in the first embodiment, a gap adjustment part for defining the distance between the lens and the through hole may be formed in the lens array plate.

Further, a latch part for maintaining the assembled state of the lens array unit may be provided in the sixth embodiment.

Figure 15:
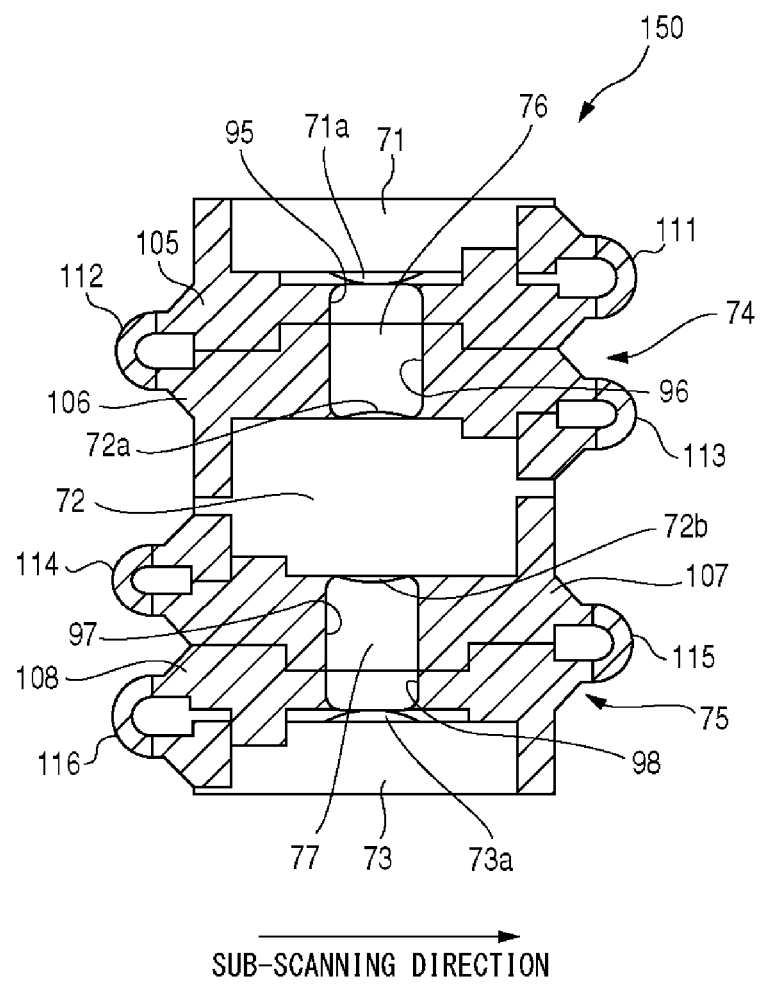
FIG. 15 shows the erecting equal-magnification lens array according to the seventh embodiment of the present invention.
Figure 16:
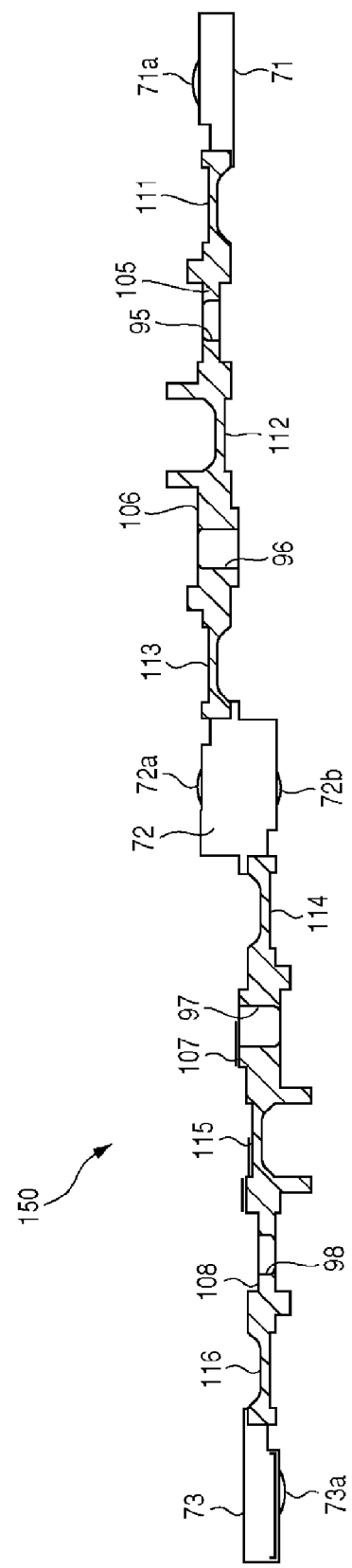
FIG. 16 is an exploded view of the erecting equal-magnification lens array according to the seventh embodiment of the present invention.

FIG. 15 shows the erecting equal-magnification lens array according to the seventh embodiment of the present invention. FIG. 16 is an exploded view of the erecting equal-magnification lens array according to the seventh embodiment of the present invention. An erecting equal-magnification lens array 150 shown in FIGS. 15 and 16 is built by building a stack of a first lens array plate 71, a second lens array plate 72, and a third lens array plate 73, providing a first light shielding member 74 between the first and second lens array plates 71 and 72, and providing a second light shielding member 75 between the second and third lens array plates 72 and 73. As in the erecting equal-magnification lens array 110 according to the fifth embodiment described above, the first and second light shielding members 74 and 75 of the erecting equal-magnification lens array 150 are split by a plane parallel to the sub-scanning direction. As in the fifth embodiment described above, the splitting plane may not necessarily be parallel to the sub-scanning direction. Those components of the erecting equal-magnification lens array 150 that are identical or corresponding to components of the erecting equal-magnification lens array 110 according to the fifth embodiment are represented by the same reference symbols and the description is omitted as appropriate.

As shown in FIG. 16, a first lens array plate 71, a second lens array plate 72, a third lens array plate 73, a first light shielding member piece 105, a second light shielding member piece 106, a third light shielding member piece 107, and a fourth light shielding member piece 108 of the erecting equal-magnification lens array 150 are formed as one piece. In the erecting equal-magnification lens array 150, one end of the first lens array plate 71 in the sub-scanning direction is joined to one end of the first light shielding member piece 105 in the sub-scanning direction via a first joint 111, the other end of the first light shielding member piece 105 is joined to one end of the second light shielding member piece 106 in the sub-scanning direction via a second joint 112, the other end of the second light shielding member piece 106 in the sub-scanning direction is joined to one end of the second lens array plate 72 via a third joint 113, the other end of the second lens array plate 72 in the sub-scanning direction is joined to one end of the third light shielding member piece 107 in the sub-scanning direction via a fourth joint 114, the other end of the third light shielding member piece 107 in the sub-scanning direction is joined to one end of the fourth light shielding member piece 108 via a fifth joint 115, and the other end of the fourth light shielding member piece 108 is joined to one end of the third lens array plate 73 via a sixth joint 116.

The erecting equal-magnification lens array 150 is built by bending the first through sixth joints 111-116 joining the first lens array plate 71, the first light shielding member piece 105, the second light shielding member piece 106, the second lens array plate 72, the third light shielding member piece 107, the fourth light shielding member piece 108, and the third lens array plate 73 such that the first lens 71a is located to directly face one opening of the first through hole 76, the second lens 72a is located to directly face the other opening of the first through hole 76, the third lens 72b is located to directly face one opening of the second through hole 77, and the fourth lens 73a is located to directly face the other opening of the second through hole 77.

The erecting equal-magnification lens array 150 according to the seventh embodiment is built by forming all components (three lens array plates and four light shielding member pieces) forming the erecting equal-magnification lens array 150 as one piece and bending the joints joining these components. Since the number of components is reduced and the lens array is built easily by merely bending the joints, the number of steps of assembly can be reduced.

In the seventh embodiment, as in the first embodiment, a gap adjustment part for defining the distance between the lens and the through hole may be formed in the lens array plate.

Further, a latch part for maintaining the assembled state of the erecting equal-magnification lens array unit may be provided in the seventh embodiment.

Figure 17A:
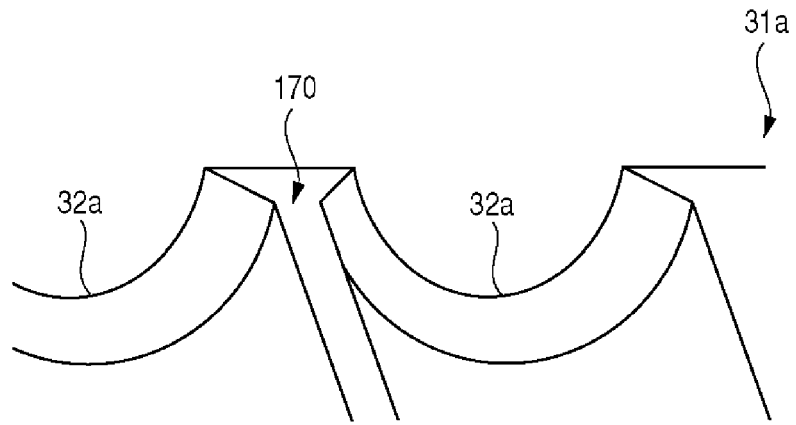
FIGS. 17A-17C are enlarged view of the vicinity of the through hole of the light shielding member piece.
Figure 17B:
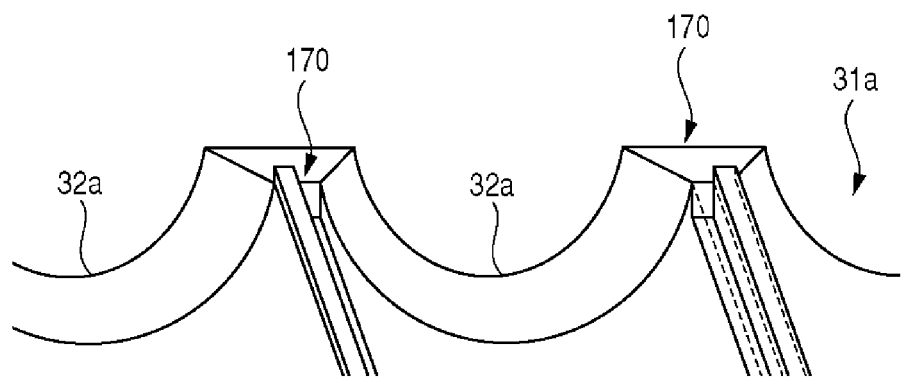
Figure 17C:
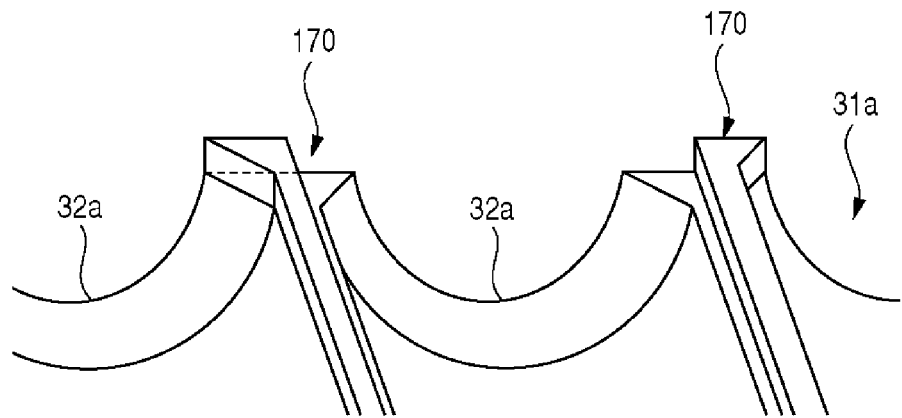

FIGS. 17A-17C are enlarged view of the vicinity of the through hole of the light shielding member piece. FIGS. 17A-17C show the vicinity of the first through hole piece 32a of the first light shielding member piece 31a produced by splitting the first light shielding member by a splitting plane through the centers of the plurality of first through holes as in the first embodiment shown in FIG. 2. The first light shielding member pieces 31a shown in FIGS. 17A-17C differ in the structure of a contact portion 170 in contact with the second light shielding member piece.

The contact portion 170 shown in FIG. 17A is formed as a flat surface. The contact portion 170 shown in FIG. 17B is formed with a convexity and a concavity engaged with the contact portion of the second light shielding member piece. FIG. 17C also shows the concave-convex fitting structure engaged with the contact portion of the second light shielding member piece. By forming the light shielding member piece according to the foregoing embodiments with the concave-convex fitting structure as shown in FIGS. 17B and 17C, misalignment between through hole pieces is eliminated or reduced so that the optical property of the erecting equal-magnification lens array is improved.

In the first through fourth embodiments, the light shielding member is split into the first light shielding member piece and the second light shielding member piece by a splitting plane through the centers of the plurality of through holes. However, the splitting plane need not extend through the centers of the through holes. What is required is to form a cylindrical through hole that functions as a light shielding wall after assembly. Therefore, the splitting plane may be configured as desired to meet the convenience of the designer. A description will now be given of a variation of the light shielding member.

Figure 18A:
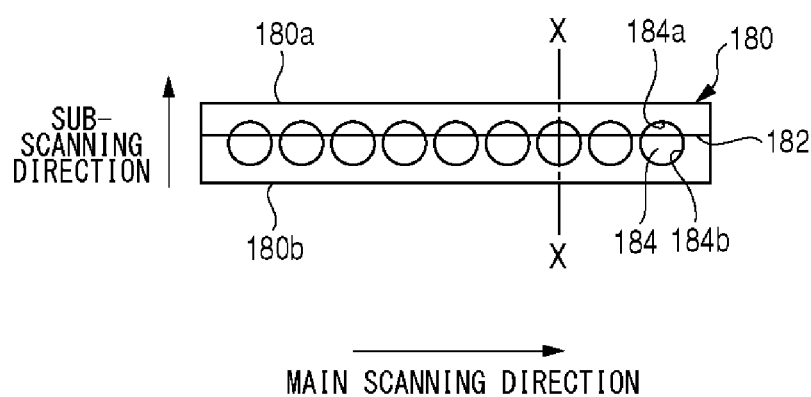
FIGS. 18A and 18B show a variation of a method of splitting the light shielding member according to the first through fourth embodiments.
Figure 18B:
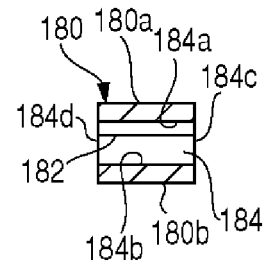

FIGS. 18A and 18B show a variation of a method of splitting the light shielding member according to the first through fourth embodiments. FIG. 18A is a front view of the light shielding member, and FIG. 18B shows an X-X cross section of the light shielding member. A light shielding member 180 is split by a splitting plane 182 into a first light shielding member piece 180a and a second light shielding member piece 180b. A first through hole piece 184a formed in the first light shielding member piece 180a and a second through hole piece 184b formed in the second light shielding member piece 180b are combined to form the through hole 184. The splitting plane 182 splitting the light shielding member 180 is displaced from the plane through the centers of the plurality of through holes 184 in the sub-scanning direction. As shown in this variation, the splitting plane 182 need only pass through both open ends 184c and 184d of the plurality of through holes 184.

Figure 19A:
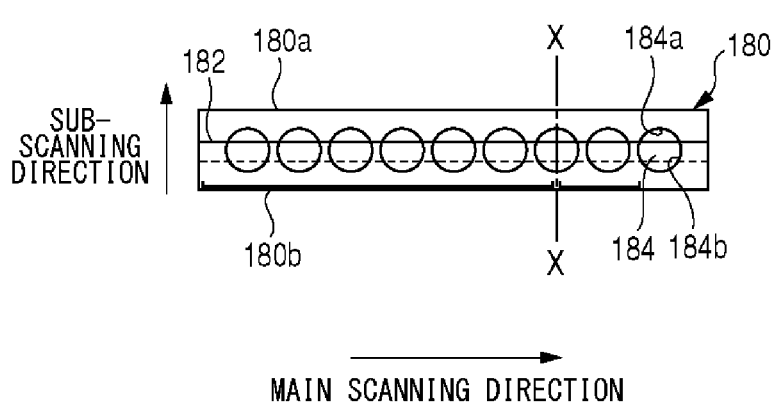
FIGS. 19A and 19B show another variation of a method of splitting the light shielding member according to the first through fourth embodiments.
Figure 19B:
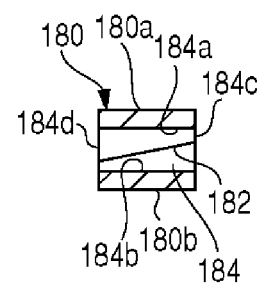

FIGS. 19A and 19B show another variation of a method of splitting the light shielding member according to the first through fourth embodiments. FIG. 19A is a front view of the light shielding member, and FIG. 19B shows an X-X cross section of the light shielding member. The light shielding member 180 shown in FIGS. 19A and 19B is also split by the splitting plane 182 into the first light shielding member piece 180a and the second light shielding member piece 180b. In this variation, the splitting plane 182 is at an angle to the direction of height of the through hole 184, as shown in FIG. 19B. The splitting plane 182 according to this variation also passes through both open ends 184c and 184d of the plurality of through holes 184.

Figure 20A:
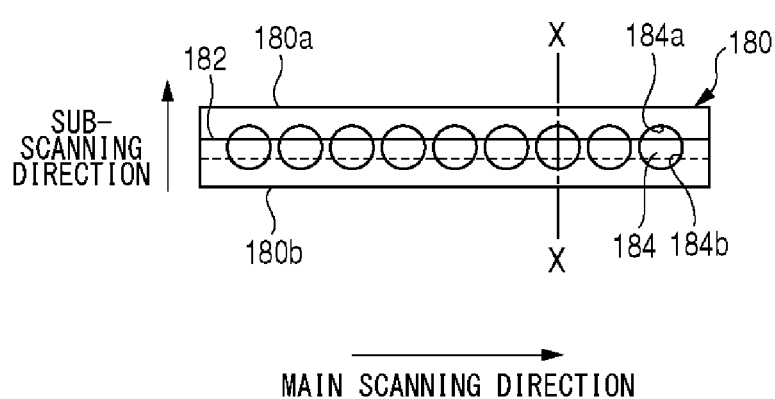
FIGS. 20A and 20B show another variation of a method of splitting the light shielding member according to the first through fourth embodiments.
Figure 20B:
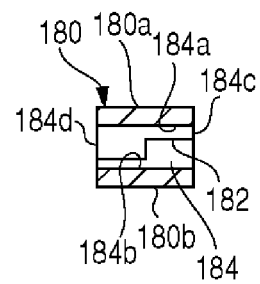

FIGS. 20A and 20B show another variation of a method of splitting the light shielding member according to the first through fourth embodiments. FIG. 20A is a front view of the light shielding member, and FIG. 20B shows an X-X cross section of the light shielding member. The light shielding member 180 shown in FIGS. 20A and 20B is also split by the splitting plane 182 into the first light shielding member piece 180a and the second light shielding member piece 180b. In this variation, the splitting plane 182 is not a flat plane but is stepped, as shown in FIG. 20B. The splitting plane 182 according to this variation also passes through both open ends 184c and 184d of the plurality of through holes 184.

Figure 21A:
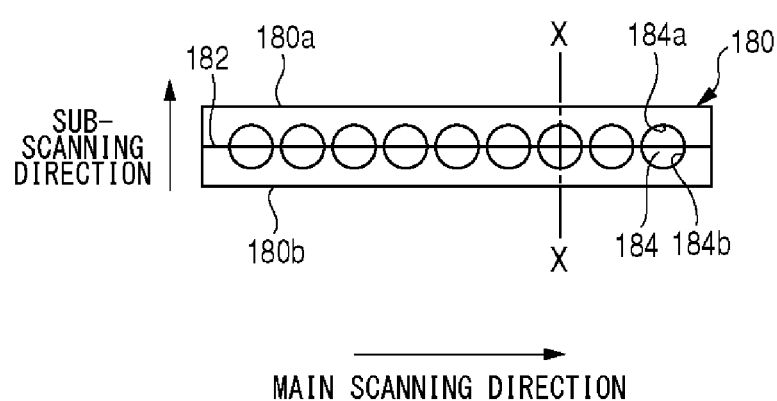
FIGS. 21A and 21B show another variation of a method of splitting the light shielding member according to the first through fourth embodiments.
Figure 21B:
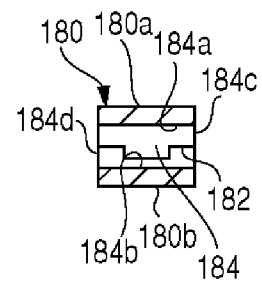

FIGS. 21A and 21B show another variation of a method of splitting the light shielding member according to the first through fourth embodiments. FIG. 21A is a front view of the light shielding member, and FIG. 21B shows an X-X cross section of the light shielding member. The light shielding member 180 shown in FIGS. 21A and 21B is also split by the splitting plane 182 into the first light shielding member piece 180a and the second light shielding member piece 180b. In this variation, the splitting plane 182 is not a flat plane but has a convex portion (or a concave portion), as shown in FIG. 21B. The splitting plane 182 according to this variation also passes through both open ends 184c and 184d of the plurality of through holes 184.

In the fifth through seventh embodiments, the light shielding member is split by a plane parallel to the sub-scanning direction. However, the splitting plane may not necessarily be parallel to the sub-scanning direction. What is required is to form a cylindrical through hole that functions as a light shielding wall after assembly. Therefore, the splitting plane may be configured as desired to meet the convenience of the designer. A description will now be given of a variation of the light shielding member.

Figure 22A:
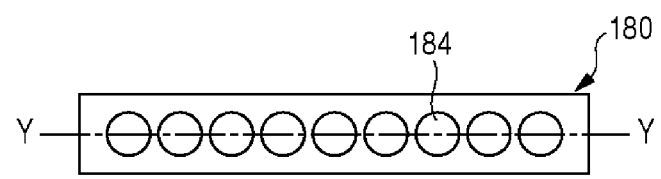
FIGS. 22A and 22B show a variation of a method of splitting the light shielding member according to the fifth through seventh embodiments.
Figure 22B:
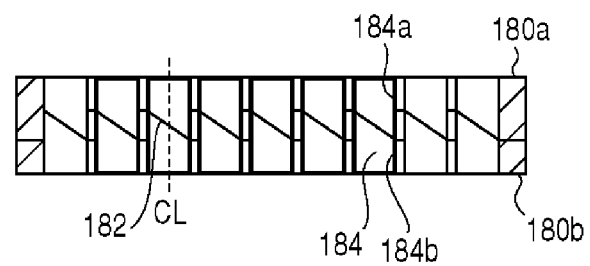

FIGS. 22A and 22B show a variation of a method of splitting the light shielding member according to the fifth through seventh embodiments. FIG. 22A is a front view of the light shielding member, and FIG. 22B shows a Y-Y cross section of the light shielding member. The light shielding member 180 shown in FIGS. 22A and 22B is split by the splitting plane 182 into the first light shielding member piece 180a and the second light shielding member piece 180b. The first through hole piece 184a formed in the first light shielding member piece 180a and the second through hole piece 184b formed in the second light shielding member piece 180b are combined to form the through hole 184. The splitting plane 182 splitting the light shielding member 180 is not parallel to the sub-scanning direction but is saw-toothed. As shown in this variation, the splitting plane 182 need only intersect the central axes CL of the plurality of through holes 184.

Figure 23A:
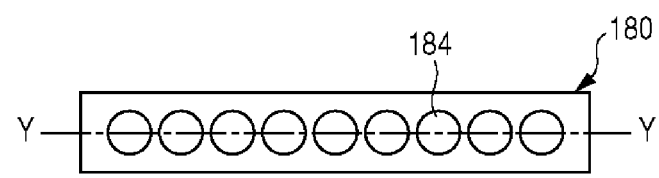
FIGS. 23A and 23B show another variation of a method of splitting the light shielding member according to the fifth through seventh embodiments.
Figure 23B:
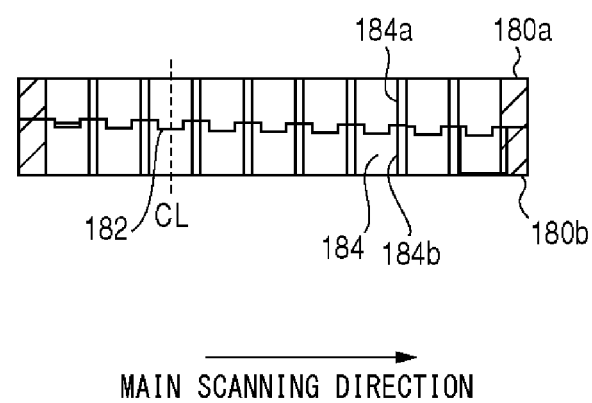

FIGS. 23A and 23B show another variation of a method of splitting the light shielding member according to the fifth through seventh embodiments. FIG. 23A is a front view of the light shielding member, and FIG. 23B shows a Y-Y cross section of the light shielding member. The light shielding member 180 shown in FIGS. 23A and 23B is also split by the splitting plane 182 into the first light shielding member piece 180a and the second light shielding member piece 180b. In this variation, the splitting plane 182 is not a flat plane parallel to the sub-scanning direction but has convex portions and concave portions. The splitting plane 182 according to this variation also intersects the central axes CL of the plurality of through holes 184.

Figure 24:
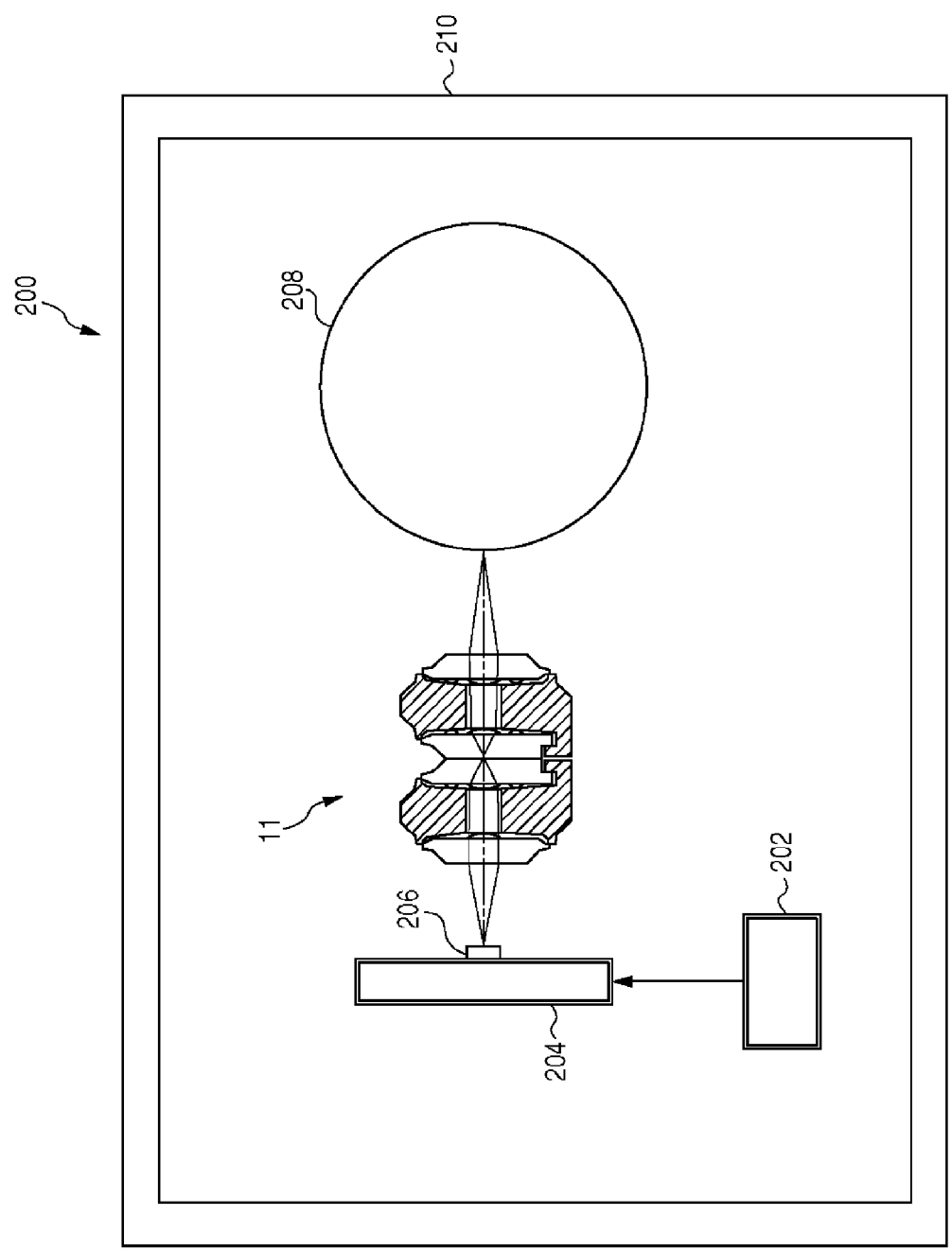
FIG. 24 shows the image writing device according to another embodiment of the present invention.

FIG. 24 shows the image writing device 200 according to another embodiment of the present invention. As shown in FIG. 24, the image writing device 200 comprises an LED array 206 comprising an array of a plurality of LED's, a substrate 204 on which the LED array 206 is mounted, a control unit 202 configured to control the LED array 206, the aforementioned erecting equal-magnification lens array 11 for condensing light emitted from the LED array 206, a photosensitive drum 208 for receiving the light transmitted through the erecting equal-magnification lens array 11, and a housing 210 for accommodating the components. In FIG. 24, the developer device, the transferring device, etc. provided around the photosensitive drum 208 are omitted from the illustration. The explanation given above of the image reading device 100 also applies to the image writing device by replacing the document G of the image reading device 100 shown in FIG. 1 by the photosensitive drum 208 in the image writing device 200 and further replacing the linear image sensor 20 of the image reading device 100 by the LED array 206 in the image writing device 200.

The image writing device 200 is provided with an LED print head which uses LED's as light sources. When an LED print head is used, pixels correspond one to one to light-emitting sources so that no mechanisms for scanning are necessary. Therefore, the size and weight of the device can be reduced as compared with a laser raster output scanner (ROS) system in which a laser light source and a polygon mirror are combined.

In the related art, a rod lens array is used as an erecting equal-magnification lens array in a device in which an LED print head is used. By using the erecting equal-magnification lens array 11 according to the present invention, the cost of the image writing device 200 can be reduced.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. A lens array unit comprising:
a lens array plate in which a plurality of lenses are provided in the main scanning direction; and
a light shielding member provided with a plurality of through holes corresponding to the lenses,
wherein the lens array plate and the light shielding member are formed as one piece such that respective ends thereof in the sub-scanning direction are joined, and
wherein the lens array unit is built by bending joints joining the lens array plate and the light shielding member such that the lens is located to directly face the corresponding through hole.

2. The lens array unit according to claim 1, further comprising a gap adjustment part for defining a distance between the lens and the through hole.

3. An erecting equal-magnification lens array comprising a stack of two lens array units according to claim 1.

4. An optical scanning unit comprising the lens array unit according to claim 1.

5. An image reading device comprising the optical scanning unit according to claim 4.

6. An image writing device comprising:
an LED array comprising an array of a plurality of LED's;
the lens array unit according to claim 1 for condensing light emitted from the LED array; and
a photosensitive drum for receiving the light transmitted through the lens array unit.

7. An erecting equal-magnification lens array comprising:
a first lens array plate in which a plurality of first lenses are provided in the main scanning direction;
a second lens array plate in which a plurality of second lenses are provided on one surface of the plate in the main scanning direction, and a plurality of third lenses are provided on the other surface in the main scanning direction;
a third lens array plate in which a plurality of fourth lenses are provided in the main scanning direction;
a first light shielding member provided with a plurality of first through holes corresponding to the first and second lenses and including a first light shielding member piece and a second light shielding member piece produced by splitting the first light shielding member by a plane through both open ends of the plurality of first through holes; and
a second light shielding member provided with a plurality of second through holes corresponding to the third and fourth lenses and including a third light shielding member piece and a fourth light shielding member piece produced by splitting the second light shielding member by a plane through both open ends of the plurality of second through holes,
wherein the first lens array plate and the first light shielding member are formed as one piece,
wherein one end of the first lens array plate in the sub-scanning direction is joined to one end of the first light shielding member piece in the sub-scanning direction, and the other end of the first lens array plate in the sub-scanning direction is joined to one end of the second light shielding member piece in the sub-scanning direction,
wherein the lens array is built by bending joints joining the first lens array plate and the first and second light shielding member pieces such that the first lens is located to directly face one opening of the first through hole,
wherein the third lens array plate and the second light shielding member are formed as one piece,
wherein one end of the third lens array plate in the sub-scanning direction is joined to one end of the third light shielding member piece in the sub-scanning direction, and the other end of the third lens array plate in the sub-scanning direction is joined to one end of the fourth light shielding member piece in the sub-scanning direction,
wherein the lens array is built by bending joints joining the third lens array plate and the third and fourth light shielding member pieces such that the fourth lens is located to directly face one opening of the second through hole, and
wherein the first, second, and third lens array plates are stacked such that the second lens is located to directly face the other opening of the first through hole and the third lens is located to directly face the other opening of the second through hole.

8. The erecting equal-magnification lens array according to claim 7, further comprising a latch part for maintaining an assembled state of the erecting equal-magnification lens array.

9. The erecting equal-magnification lens array according to claim 7, further comprising:
a first gap adjustment part for defining a distance between the first lens and the first through hole, a second gap adjustment part for defining a distance between the second lens and the first through hole, a third gap adjustment part for defining a distance between the third lens and the second through hole, and a fourth gap adjustment part for defining a distance between the fourth lens and the second through hole.

10. The erecting equal-magnification lens array according to claim 7,
wherein a concave-convex fitting structure is formed in a portion of contact between the first light shielding member piece and the second light shielding member piece, and a concave-convex fitting structure is formed in a portion of contact between the third light shielding member piece and the fourth light shielding member piece.

11. A lens array unit comprising:
a first lens array plate in which a plurality of first lenses are provided in the main scanning direction;
a second lens array plate in which a plurality of second lenses are provided in the main scanning direction; and
a light shielding member provided with a plurality of through holes corresponding to the first and second lenses and including a first light shielding member piece and a second light shielding member piece produced by splitting the light shielding member by a plane intersecting central axes of the plurality of through holes,
wherein one end of the first lens array plate in the sub-scanning direction is joined to one end of the first light shielding member piece in the sub-scanning direction, the other end of the first light shielding member piece in the sub-scanning direction is joined to one end of the second light shielding member piece in the sub-scanning direction, and the other end of the second light shielding member piece in the sub-scanning direction is joined to one end of the second lens array plate in the sub-scanning direction,
wherein the first lens array plate, the second lens array plate, the first light shielding member piece, and the second light shielding member piece are formed as one piece, and
wherein the lens array is built by bending joints joining the first lens array plate, the second lens array plate, the first light shielding member piece, and the second light shielding member piece such that the first lens is located to directly face one opening of the through hole, and the second lens is located to directly face the other opening of the through hole.

12. The lens array unit according to claim 11, further comprising:
a latch part for maintaining an assembled state of the lens array unit.

13. The lens array unit according to claim 11, further comprising:
a first gap adjustment part for defining a distance between the first lens and the through hole and a second gap adjustment part for defining a distance between the second lens and the through hole.

14. The lens array unit according to claim 11,
wherein a concave-convex fitting structure is formed in a portion of contact between the first light shielding member piece and the second light shielding member piece.

15. An erecting equal-magnification lens array comprising a stack of two lens array units according to claim 11.

16. The erecting equal-magnification lens array according to claim 15,
wherein the two lens array units are stacked such that surfaces thereof not formed with lenses face each other.

17. An erecting equal-magnification lens array comprising:
a first lens array plate in which a plurality of first lenses are provided in the main scanning direction;
a second lens array plate in which a plurality of second lenses are provided on one surface of the plate in the main scanning direction, and a plurality of third lenses are provided on the other surface in the main scanning direction;
a third lens array plate in which a plurality of fourth lenses are provided in the main scanning direction;
a first light shielding member provided with a plurality of first through holes corresponding to the first and second lenses and including a first light shielding member piece and a second light shielding member piece produced by splitting the first light shielding member by a plane intersecting central axes of the plurality of first through holes; and
a second light shielding member provided with a plurality of second through holes corresponding to the third and fourth lenses and including a third light shielding member piece and a fourth light shielding member piece produced by splitting the second light shielding member by a plane intersecting central axes of the plurality of second through holes,
wherein the first lens array plate, the second lens array plate, the third lens array plate, the first light shielding member piece, the second light shielding member piece, the third light shielding member piece, and the fourth light shielding member piece are formed as one piece, and
wherein one end of the first lens array plate in the sub-scanning direction is joined to one end of the first light shielding member piece in the sub-scanning direction, the other end of the first light shielding member piece in the sub-scanning direction is joined to one end of the second light shielding member piece in the sub-scanning direction, the other end of the second light shielding member piece in the sub-scanning direction is joined to one end of the second lens array plate in the sub-scanning direction, the other end of the second lens array plate in the sub-scanning direction is joined to one end of the third light shielding member piece in the sub-scanning direction, the other end of the third light shielding member piece in the sub-scanning direction is joined to one end of the fourth light shielding member piece in the sub-scanning direction, and the other end of the fourth light shielding member piece in the sub-scanning direction is joined to one end of the third lens array plate in the sub-scanning direction,
wherein the lens array is built by bending joints joining the first lens array plate, the first light shielding member piece, the second light shielding member piece, the second lens array plate, the third light shielding member piece, the fourth light shielding member piece, and the third lens array plate such that the first lens is located to directly face one opening of the first through hole, the second lens is located to directly face the other opening of the first through hole, the third lens is located to directly face one opening of the second through hole, and the fourth lens is located to directly face the other opening of the second through hole.

18. The erecting equal-magnification lens array according to claim 17, further comprising:
a latch part for maintaining an assembled state of the erecting equal-magnification lens array unit.

19. The erecting equal-magnification lens array according to claim 17, further comprising:
a first gap adjustment part for defining a distance between the first lens and the first through hole, a second gap adjustment part for defining a distance between the second lens and the first through hole, a third gap adjustment part for defining a distance between the third lens and the second through hole, and a fourth gap adjustment part for defining a distance between the fourth lens and the second through hole.

20. The erecting equal-magnification lens array according to claim 17,
wherein a concave-convex fitting structure is formed in a portion of contact between the first light shielding member piece and the second light shielding member piece, and/or a concave-convex fitting structure is formed in a portion of contact between the third light shielding member piece and the fourth light shielding member piece.

* * * * *